(12) United States Patent
Saito

(10) Patent No.: US 11,960,066 B2
(45) Date of Patent: Apr. 16, 2024

(54) ZOOM LENS AND IMAGE PICKUP APPARATUS

(71) Applicant: CANON KABUSHIKI KAISHA, Tokyo (JP)

(72) Inventor: Shinichiro Saito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 17/368,285

(22) Filed: Jul. 6, 2021

(65) Prior Publication Data
US 2022/0019065 A1      Jan. 20, 2022

(30) Foreign Application Priority Data
Jul. 14, 2020   (JP) ................................. 2020-120924

(51) Int. Cl.
*G02B 15/14*      (2006.01)
*G02B 13/00*      (2006.01)

(52) U.S. Cl.
CPC . *G02B 15/145121* (2019.08); *G02B 13/0045* (2013.01); *G02B 13/006* (2013.01); *G02B 15/1461* (2019.08)

(58) Field of Classification Search
CPC ........ G02B 15/145121; G02B 13/0045; G02B 13/006; G02B 15/1461; G02B 15/145113; G02B 15/145129; G02B 15/145105; G02B 15/1441; G02B 15/144105; G02B 15/144113
See application file for complete search history.

(56) References Cited

U.S. PATENT DOCUMENTS

| | | | |
|---|---|---|---|
| 2011/0279909 A1* | 11/2011 | Nakagawa | G02B 15/145129 359/683 |
| 2020/0142167 A1 | 5/2020 | Kikuchi | |
| 2020/0264413 A1* | 8/2020 | Yamanaka | G02B 13/18 |

FOREIGN PATENT DOCUMENTS

| | | |
|---|---|---|
| JP | 2001350093 A | 12/2001 |
| JP | 2005-181635 A | 7/2005 |
| JP | 2009047903 A | 3/2009 |
| JP | 2011002503 A | 1/2011 |

(Continued)

OTHER PUBLICATIONS

MIL-HDBK-141 "Military Standardization Handbook Optical Design" pp. 8-15 (Year: 1962).*

*Primary Examiner* — George G. King
(74) *Attorney, Agent, or Firm* — CANON U.S.A., INC. IP Division

(57) ABSTRACT

A zoom lens includes, in order from an object side to an image side, first, second and third lens units having positive, negative and positive refractive powers. The first lens unit moves during zooming. During zooming from a wide-angle end to a telephoto end, a distance between the first and second lens units widens, and a distance between the second and third lens units narrows. The first lens unit consists of three or less lenses. The second lens unit consists of, in order from the object side to the image side, a first single lens as a spherical lens having a negative refractive power, a cemented lens in which a lens having a negative refractive power and a lens having a positive refractive power are cemented, and a second single lens as a spherical lens having a negative refractive power. A predetermined condition is satisfied.

18 Claims, 13 Drawing Sheets

(56) References Cited

FOREIGN PATENT DOCUMENTS

| | | |
|---|---|---|
| JP | 2013003288 A | 1/2013 |
| JP | 2013178298 A | 9/2013 |
| JP | 2014153436 A | 8/2014 |
| JP | 2014235238 A | 12/2014 |
| JP | 2016-156902 A | 9/2016 |
| JP | 2020-071439 A | 5/2020 |
| JP | 2020134684 A | 8/2020 |
| WO | 2012102105 A | 8/2012 |

* cited by examiner

ZOOM LENS AND IMAGE PICKUP APPARATUS

BACKGROUND OF THE DISCLOSURE

Field of the Disclosure

The aspect of the embodiments relates to a zoom lens suitable for an image pickup apparatus such as a still camera and a video camera.

Description of the Related Art

A zoom lens of an inner focus type or a rear focus type performs focusing by moving a lens unit on an image side of a first lens unit which is on a most object side. Japanese Patent Application Laid-Open No. ("JP") 2016-156902 discloses a rear focus type zoom lens consisting of, in order from an object side to an image side, first to fifth lens units having positive, negative, positive, negative and positive refractive powers, where each of the fourth lens unit and the fifth lens unit consists of two or less lenses. JP 2005-181635 discloses a zoom lens including, in order from an object side to an image side, first and second lens units having positive and negative refractive powers, and having a high magnification and a thin thickness by including the first lens unit having a prism element that bends an optical path.

In one embodiment, a zoom lens is to be small, to be robust to manufacturing errors, and to have a high optical performance. However, the zoom lens disclosed in JP 2016-156902 has a long overall lens length and is not sufficiently small. The zoom lens disclosed in JP 2005-181635 has a difficulty in moving the first lens unit including the large prism element, and thus has an issue of an increase in an overall lens length in a wide-angle area.

SUMMARY OF THE DISCLOSURE

A zoom lens according to one aspect of the embodiments includes four or more lens units including, in order from an object side to an image side, a first lens unit having a positive refractive power, a second lens unit having a negative refractive power, and a third lens unit having a positive refractive power. A distance between adjacent lens units varies during zooming from a wide-angle end to a telephoto end. The first lens unit moves during zooming. A distance between the first lens unit and the second lens unit widens during zooming from the wide-angle end to the telephoto end. A distance between the second lens unit and the third lens unit narrows during zooming from the wide-angle end to the telephoto end. The first lens unit consists of three or less lenses. The second lens unit consists of, in order from the object side to the image side, a first single lens as a spherical lens having a negative refractive power, a cemented lens in which a lens having a negative refractive power and a lens having a positive refractive power are cemented, and a second single lens as a spherical lens having a negative refractive power. A predetermined condition is satisfied.

An image pickup apparatus according to another aspect of the embodiments includes the above zoom lens.

Further features of the present disclosure will become apparent from the following description of exemplary embodiments with reference to the attached drawings.

DESCRIPTION OF THE EMBODIMENTS

Figure 1:
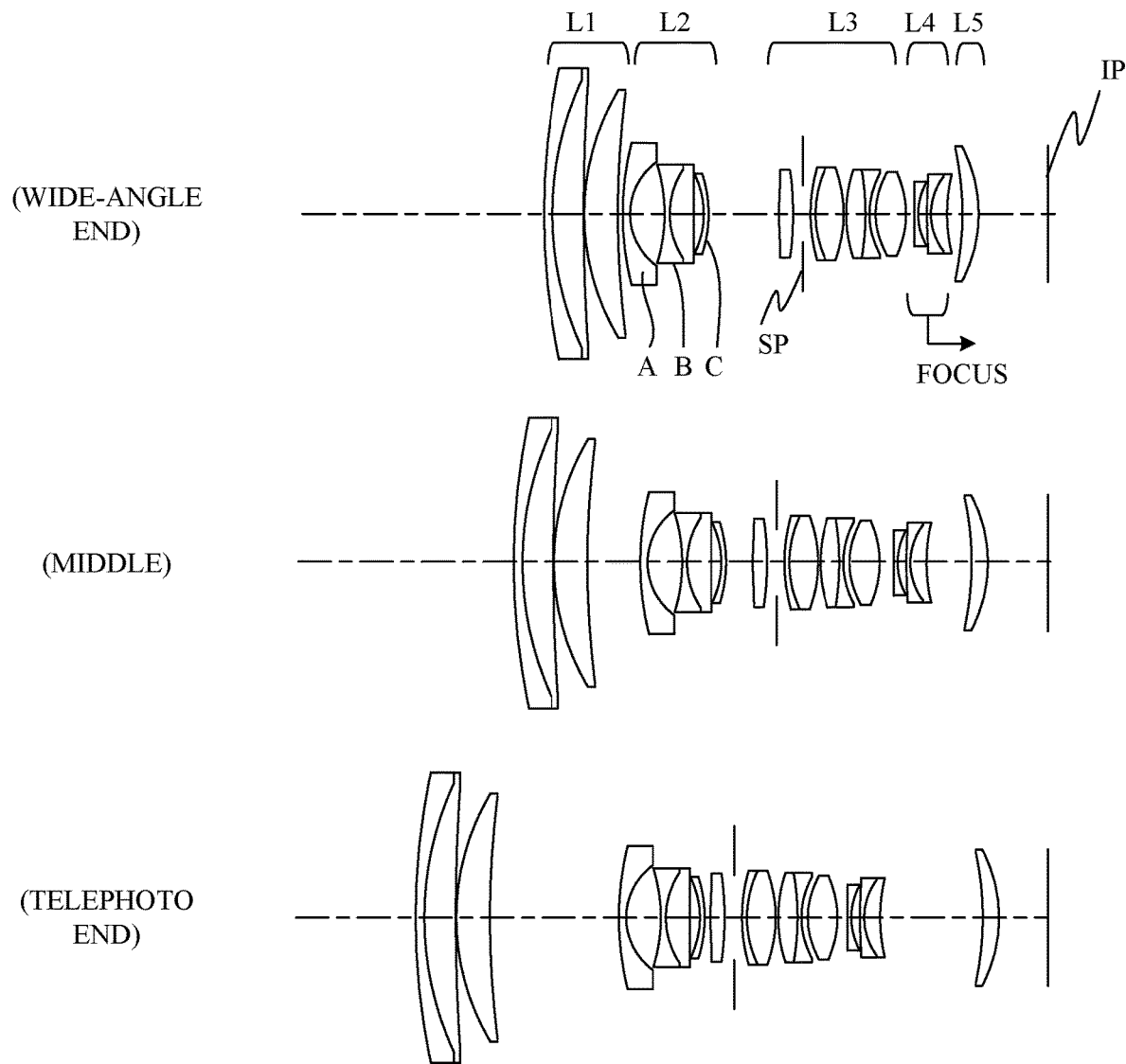
FIG. 1 is a sectional view illustrating a zoom lens at a wide-angle end, a middle zoom position, and a telephoto end, according to an Example 1.
Figure 2A:
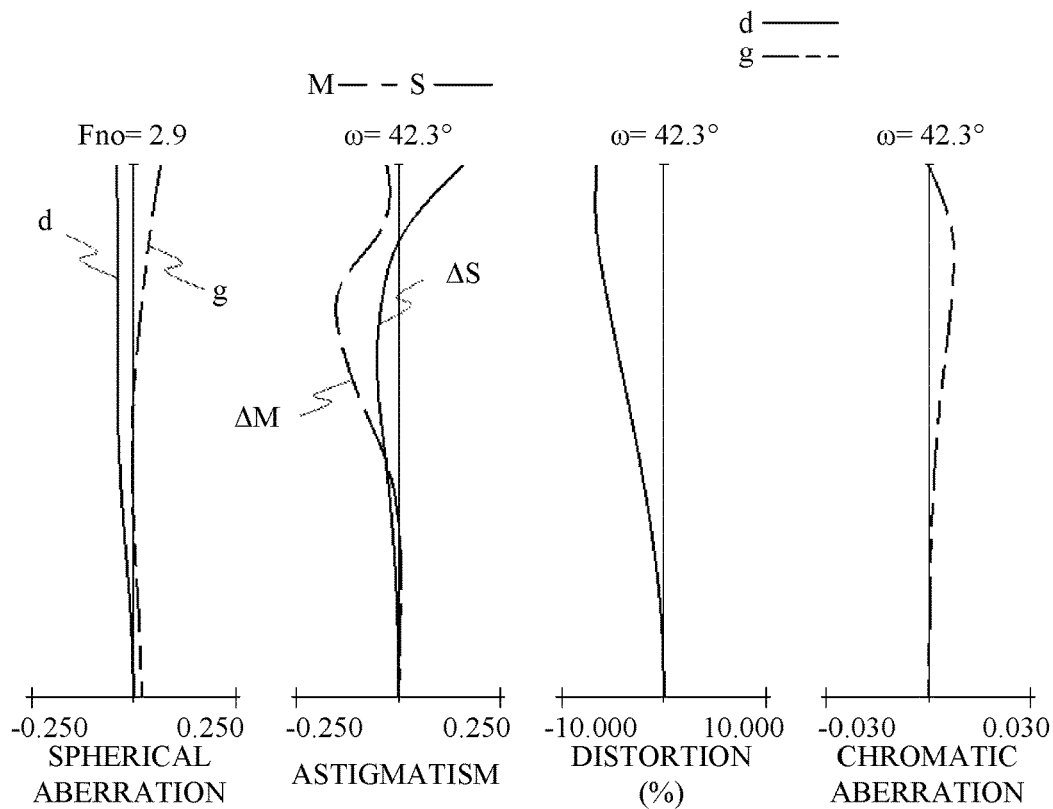
FIGS. 2A to 2C are aberration diagrams of the zoom lens at the wide-angle end, the middle zoom position, and the telephoto end, according to the Example 1.
Figure 2B:
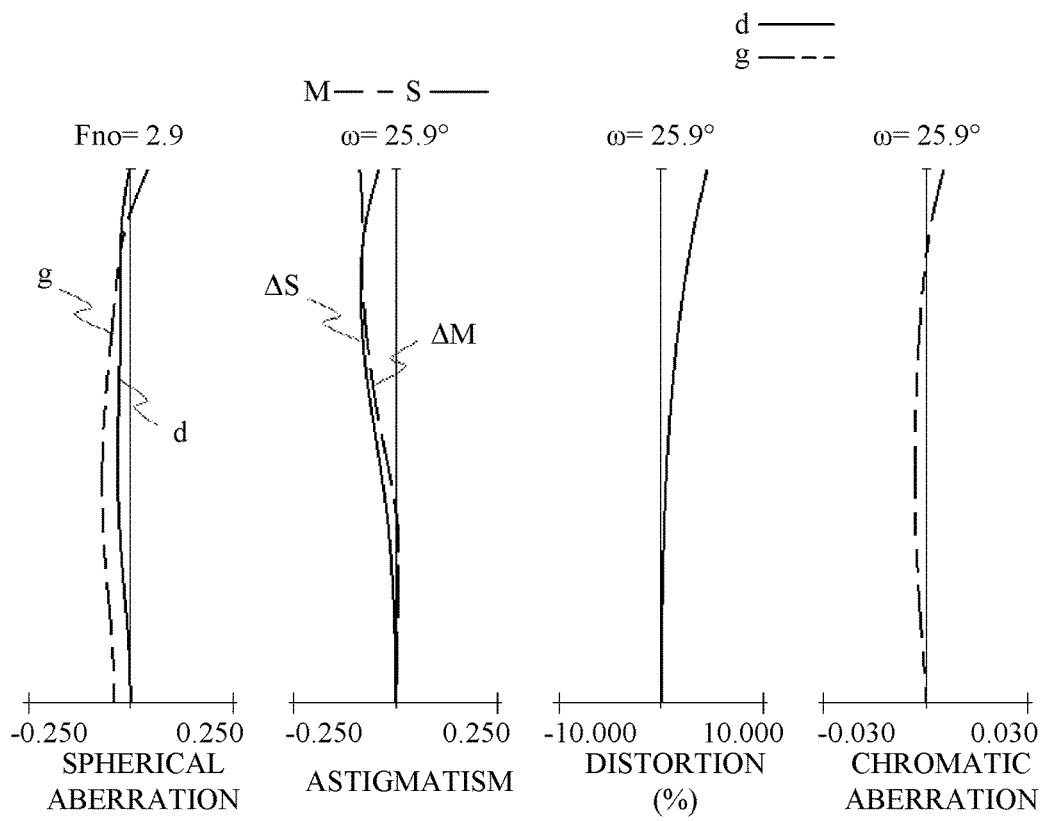
Figure 2C:
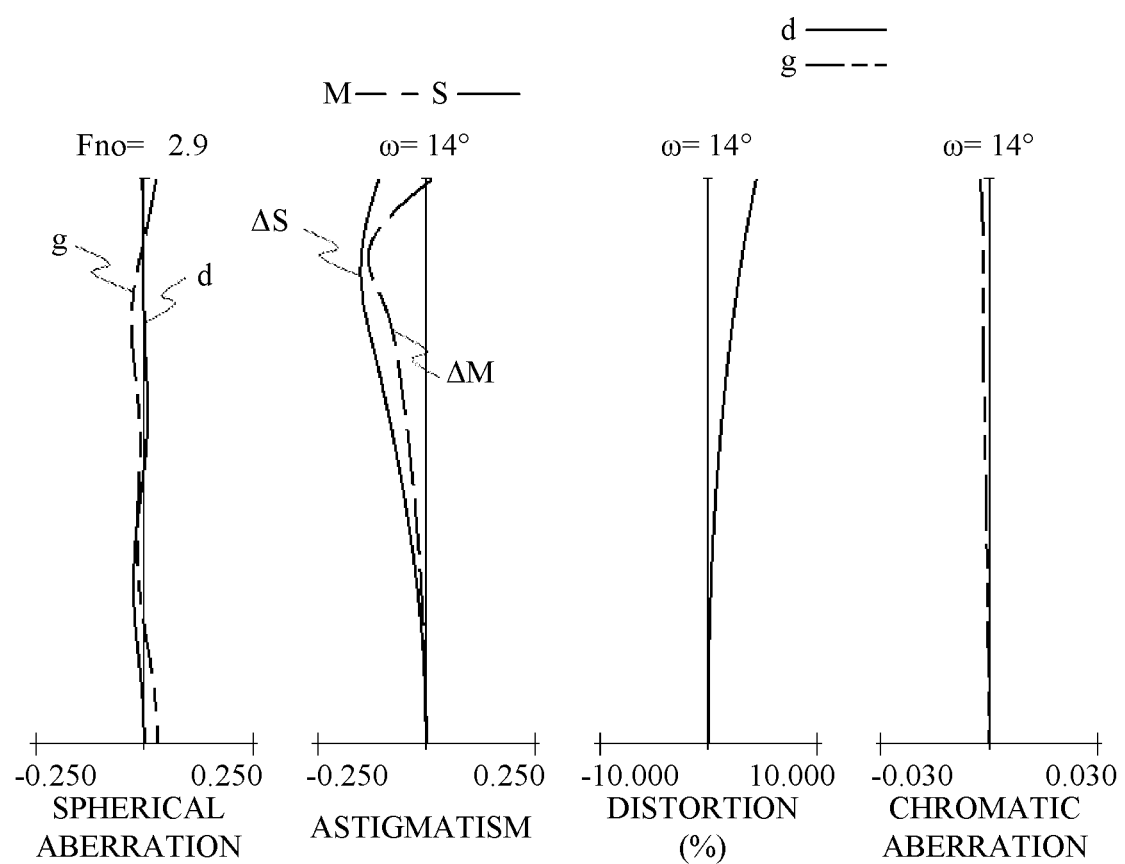
Figure 3:
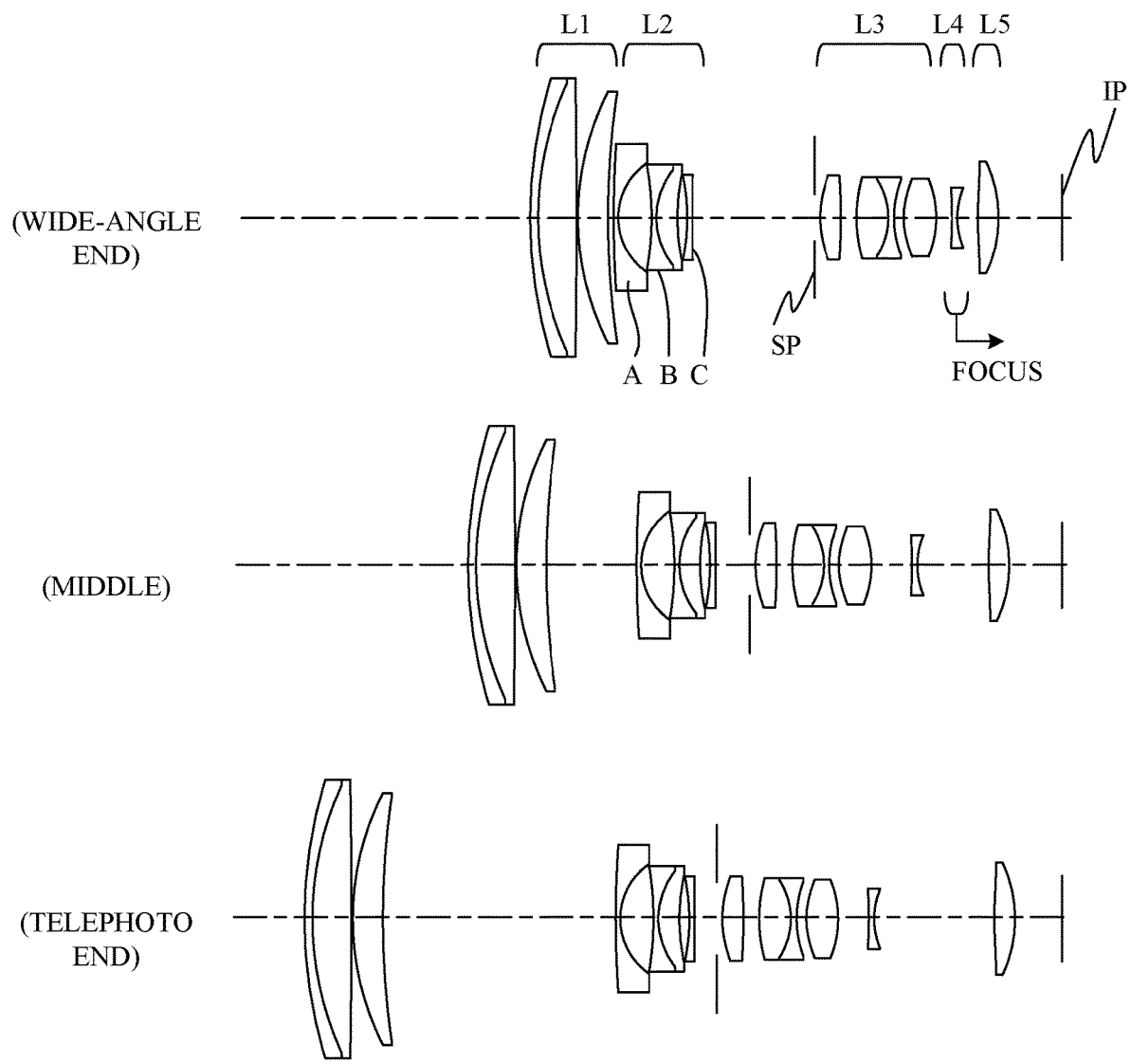
FIG. 3 is a sectional view illustrating a zoom lens at a wide-angle end, a middle zoom position, and a telephoto end, according to an Example 2.
Figure 4A:
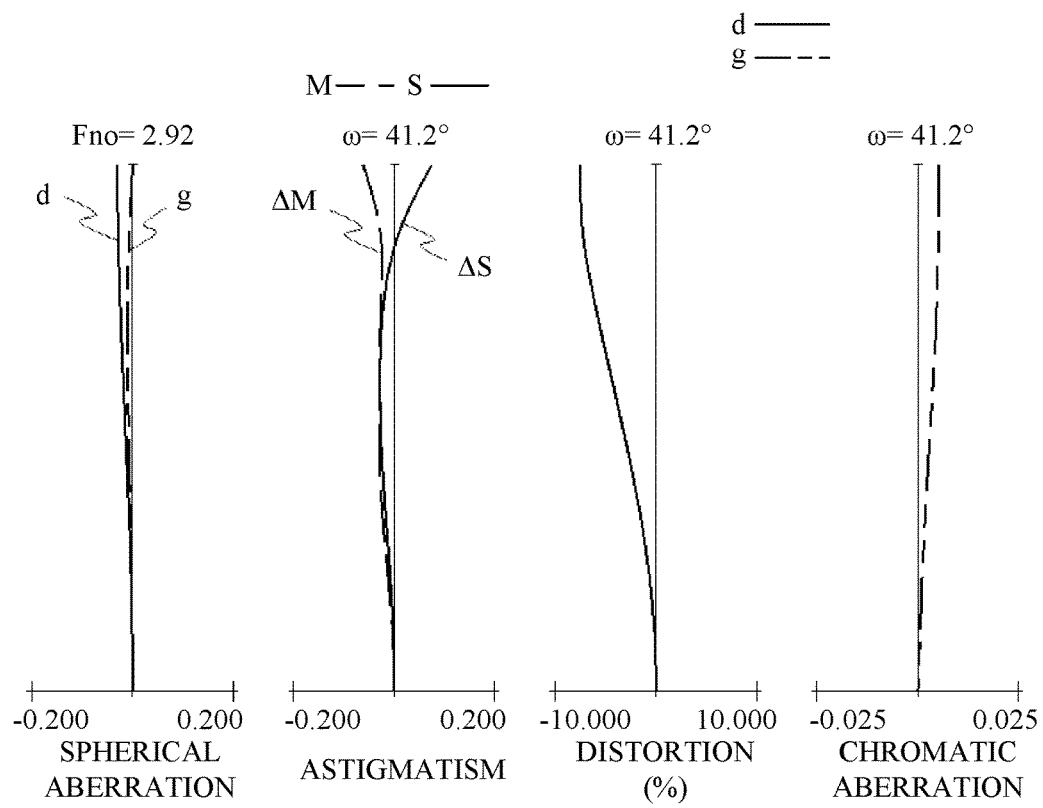
FIGS. 4A to 4C are aberration diagrams of the zoom lens at the wide-angle end, the middle zoom position, and the telephoto end, according to the Example 2.
Figure 4B:
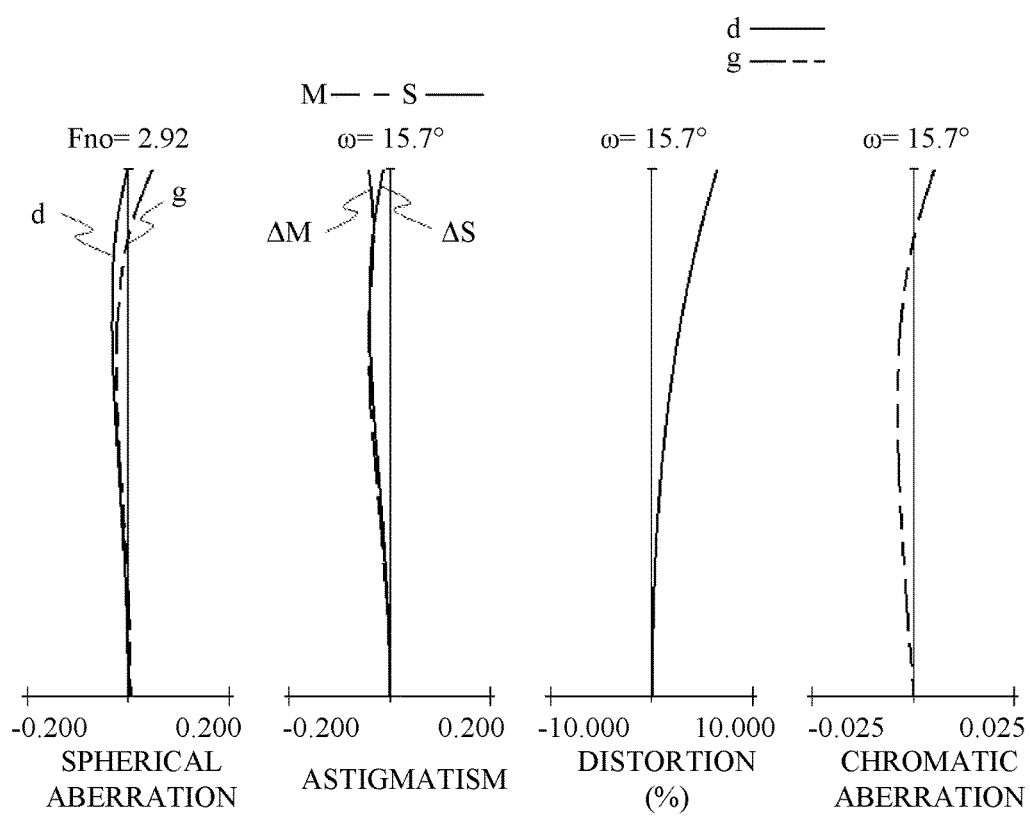
Figure 4C:
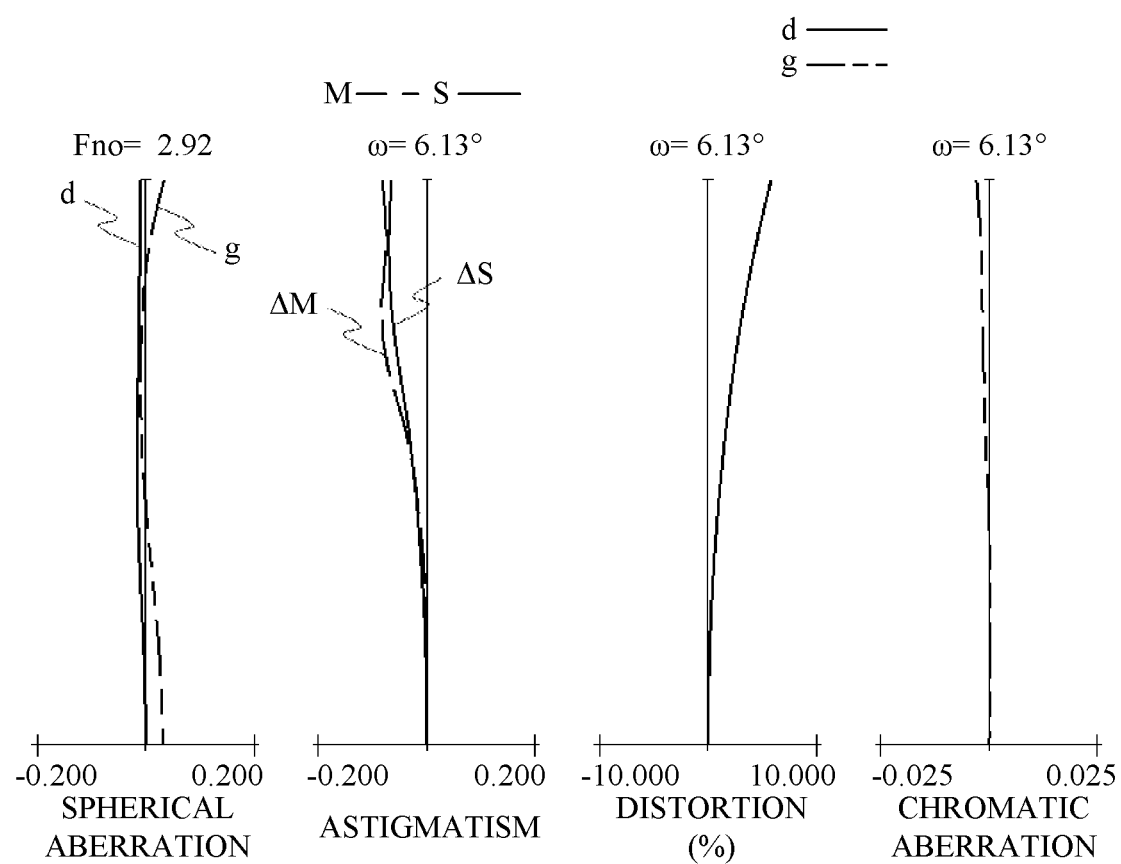

Referring now to the accompanying drawings, a description will be given of embodiments according to the present disclosure. Each of FIGS. 1, 3, 5, and 7 are sectional view illustrating a zoom lens at a wide-angle end, i.e., a shortest focal length, at a middle zoom position, and at a telephoto end, i.e., a longest focal length, according to each of Examples 1, 2, 3, and 4. In each sectional view, a left side is an object side and a right side is an image side.

The zoom lens according to each example includes four or more lens units including, in order from the object side to the image side, a first lens unit L1 having a positive refractive power (=reciprocal of a focal length), a second lens unit L2 having a negative refractive power, and a third lens unit L3 having a positive refractive power. During zooming from the wide-angle end to the telephoto end, a distance between the first lens unit L1 and the second lens unit L2 widens, and a distance between the second lens unit L2 and the third lens unit L3 narrows. During zooming, the first lens unit L1 moves. Also, during zooming, each distance varies between adjacent lens units of a plurality of lens units (L4 to L7) on the image side of the third lens unit L3.

A lens unit is a group of one or a plurality of lenses, and during zooming or focusing, each distance between adjacent lens units varies. The wide-angle end and the telephoto end refer to a state (or a zoom position) when the lens unit is located at both ends of a mechanically movable range in an optical axis direction during zooming.

Each of the above-described zoom lens according to each example includes, in order from the object side to the image side, positive, negative and positive lens units so as to shorten an overall lens length at the wide-angle end and so as to correct aberration well in an entire zoom area. Each zoom lens includes four or more lens units, and thereby it is possible to correct well spherical aberration and coma occurring in the first lens unit L1 and the second lens unit L2.

In a zoom area on the telephoto side, variations in spherical aberration and coma are likely to be large due to a manufacturing error. Since the zoom lens is a positive lead type in which the first lens unit L1 has the positive refractive power, it is possible to lower a height of an on-axis ray entering the lenses on the image side of the second lens unit L2, and thereby the size can be reduced and a robustness to the manufacturing error is improved.

In order to ensure a high magnification variation ratio while having the small size, during zooming, the zoom lens moves each lens unit so that a distance between the first lens unit L1 and the second lens unit L2 at the telephoto end is wider than that at the wide-angle end, and that a distance between the second lens unit L2 and the third lens unit L3 at the telephoto end is narrower than that at the wide-angle end.

In the zoom lens according to each example, the first lens unit L1 consists of three or less lenses. When the number of lenses is reduced in the first lens unit L1 having a large lens diameter, the size and weight can be reduced. Moreover, it is possible to lower the height of the ray emitted from the first lens unit L1, and to correct well various off-axis aberration such as coma and field curvature.

In the zoom lens according to each example, the second lens unit L2 consists of, in order from the object side to the image side, a single lens A, which is also referred to as a first single lens, as a spherical lens having a negative refractive power, a cemented lens B in which a lens having a negative refractive power and a lens having a positive refractive power are cemented, and a single lens C, which is also referred to as a second single lens, as a spherical lens having a negative refractive power. Since the second lens unit L2 includes a spherical lens, it is possible to reduce a surface shape error, which is an error caused by a rotational asymmetrical component and a spherical surface shape variation component and is likely to occur in an aspherical lens. Further, while the second lens unit L2 has the increased refractive power, field curvature in the wide-angle area and the spherical aberration in the telephoto area can be corrected well, and an entire system can be made small.

Since the negative single lens A is disposed on the most object side in the second lens unit L2, a power arrangement in the second lens unit L2 is a retrofocus type, and therefore field curvature in the wide-angle area can be corrected well.

Since the second lens unit L2 includes the cemented lens B, which consists of the negative lens and the positive lens, on the image side of the negative single lens A, it is possible to correct well field curvature in the wide-angle area and spherical aberration in the telephoto area, to reduce the variations in spherical aberration and coma in the telephoto area caused by the manufacturing error, which is an eccentrical error, and thereby to ensure a good optical performance Since the negative single lens C is disposed on the image side of the cemented lens B, it is possible to correct well off-axis coma and field curvature in the wide-angle area, while a share of refractive power and a share of magnification variation of the second lens unit L2 are ensured.

In the zoom lens of each example, the third lens unit L3 includes a diaphragm SP configured to determine (or limit) a light beam of an open F-number (Fno), and focusing is performed by moving a lens unit on the image side of the third lens unit L3. In each sectional view, an arrow indicates a moving direction of a lens unit during focusing from an infinite distance to a short distance.

In each sectional view, IP represents an image plane. When the zoom lens of each example is used as an image pickup optical system of an image pickup apparatus such as a video camera, a digital still camera, a TV camera, a silver-halide film camera, or the like, on the position of the image plane IP, an image pickup plane of a solid image sensor, which is a photoelectric conversion element, such as a CCD sensor or a CMOS sensor, or a film surface, which is a photosensitive surface, of a silver-halide film is disposed. The zoom lens of each example can be also used as a projection optical system for an image projection apparatus, that is, a projector.

Hereinafter, the zoom lens of each example will be described in detail.

A zoom lens of the Example 1 illustrated in FIG. 1 has a zoom ratio of 3.3 and an aperture ratio of about 2.9 in an entire zoom area. A zoom lens of the Example 2 illustrated in FIG. 3 has a zoom ratio of 7.1 and an aperture ratio of about 2.9 in an entire zoom area. In each of the zoom lenses of the Examples 1 and 2, first, second and third lens units L1, L2 and L3 respectively have positive, negative and positive refractive powers, as described above, a fourth lens unit L4 has a negative refractive power, and a fifth lens unit L5 has a positive refractive power. In each of the zoom lenses of the Examples 1 and 2, during zooming from a wide-angle end to a telephoto end, the first lens unit L1 monotonically moves to an object side, and the second lens unit L2 to the fifth lens unit L5 move so that a distance between the first lens unit L1 and the second lens unit L2 widens, a distance between the second lens unit L2 and the third lens unit L3 narrows, a distance between the third lens unit L3 and the fourth lens unit L4 varies, and a distance between the fourth lens unit L4 and the fifth lens unit L5 widens. During focusing from an infinite distance to a short distance, the fourth lens unit L4 moves to an image side.

Figure 5:
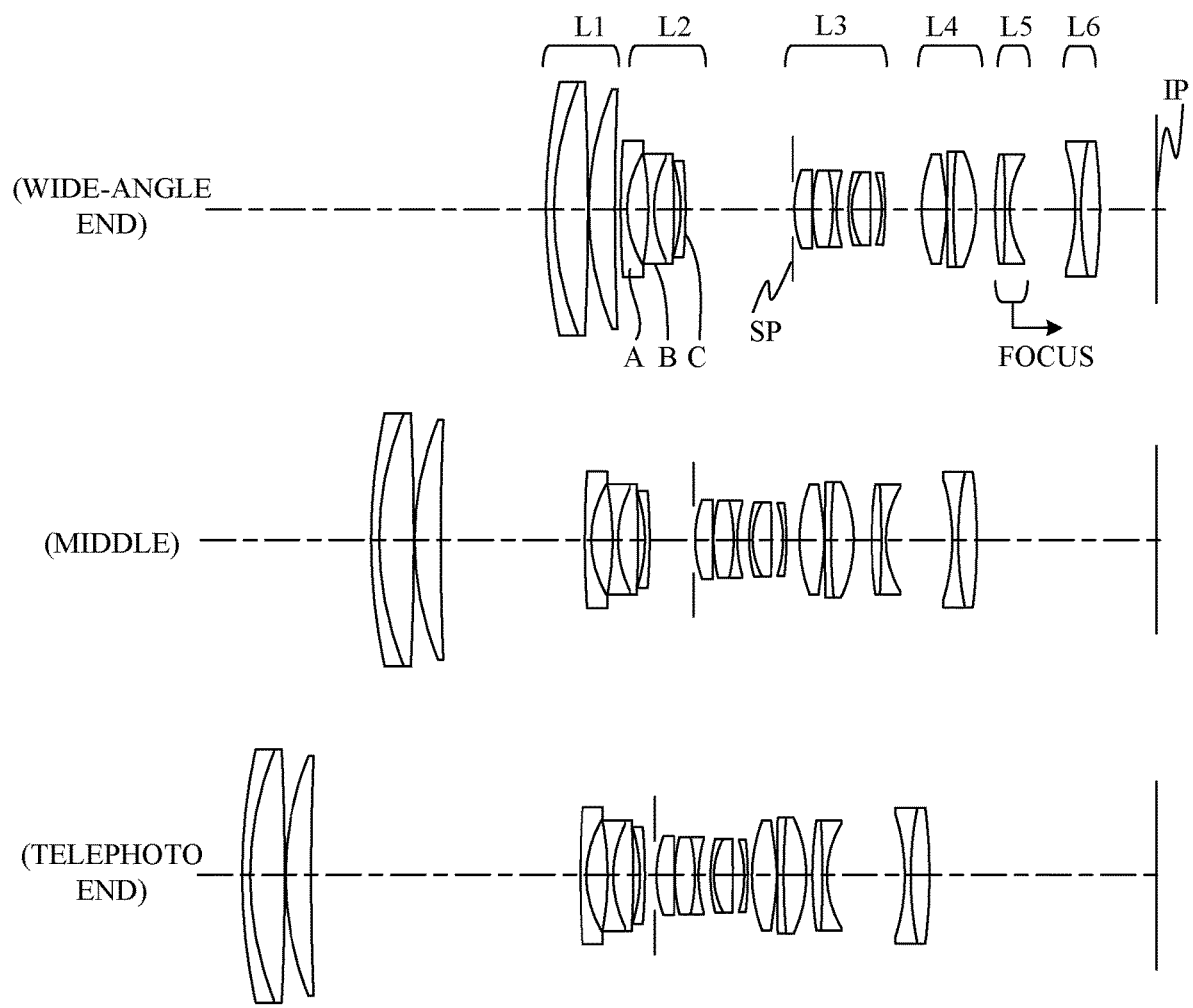
FIG. 5 is a sectional view illustrating a zoom lens at a wide-angle end, a middle zoom position, and a telephoto end, according to an Example 3.
Figure 6A:
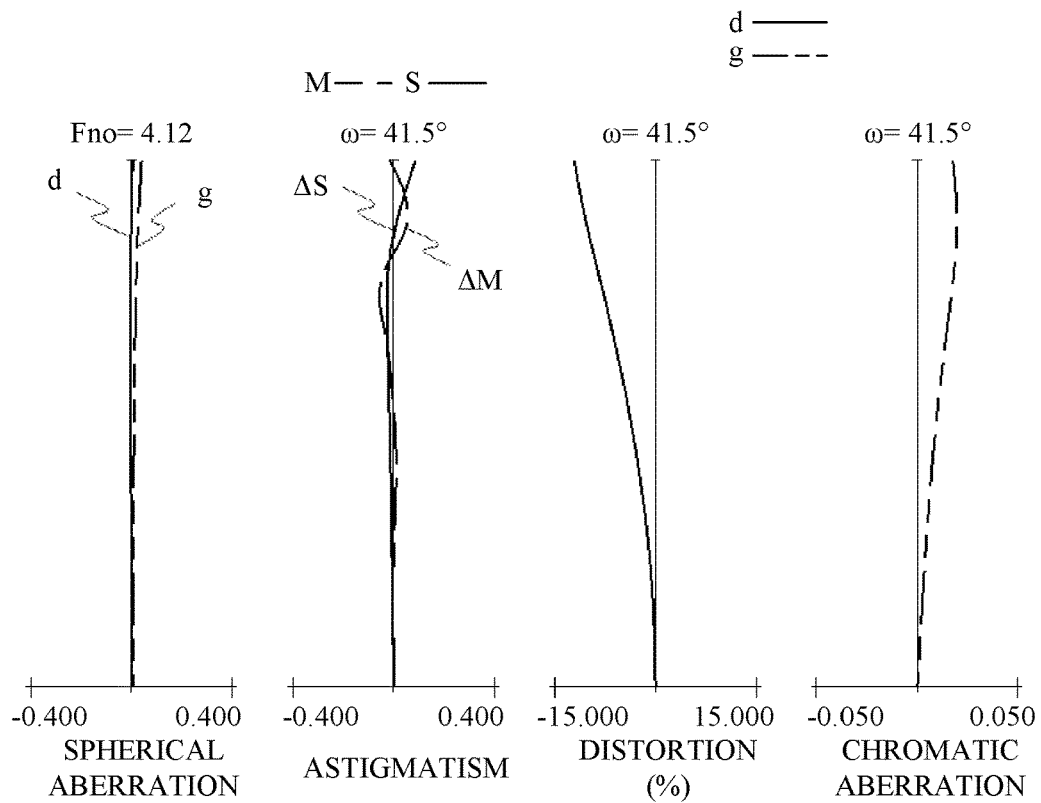
FIGS. 6A to 6C are aberration diagrams of the zoom lens at the wide-angle end, the middle zoom position, and the telephoto end, according to the Example 3.
Figure 6B:
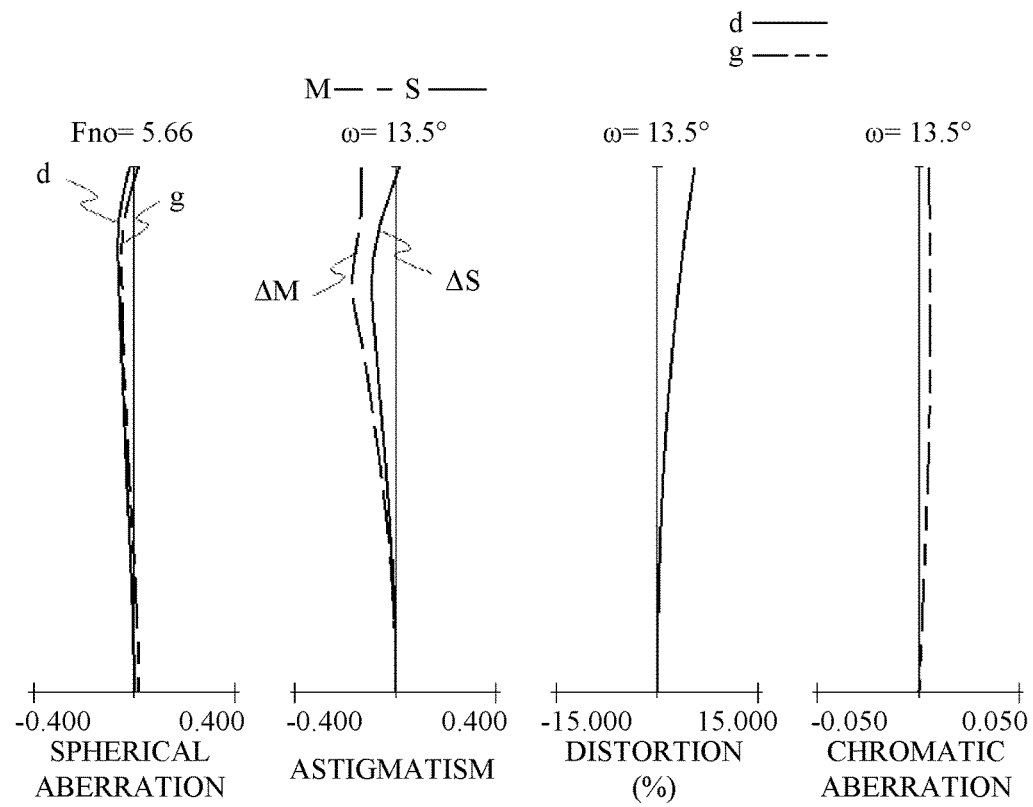
Figure 6C:
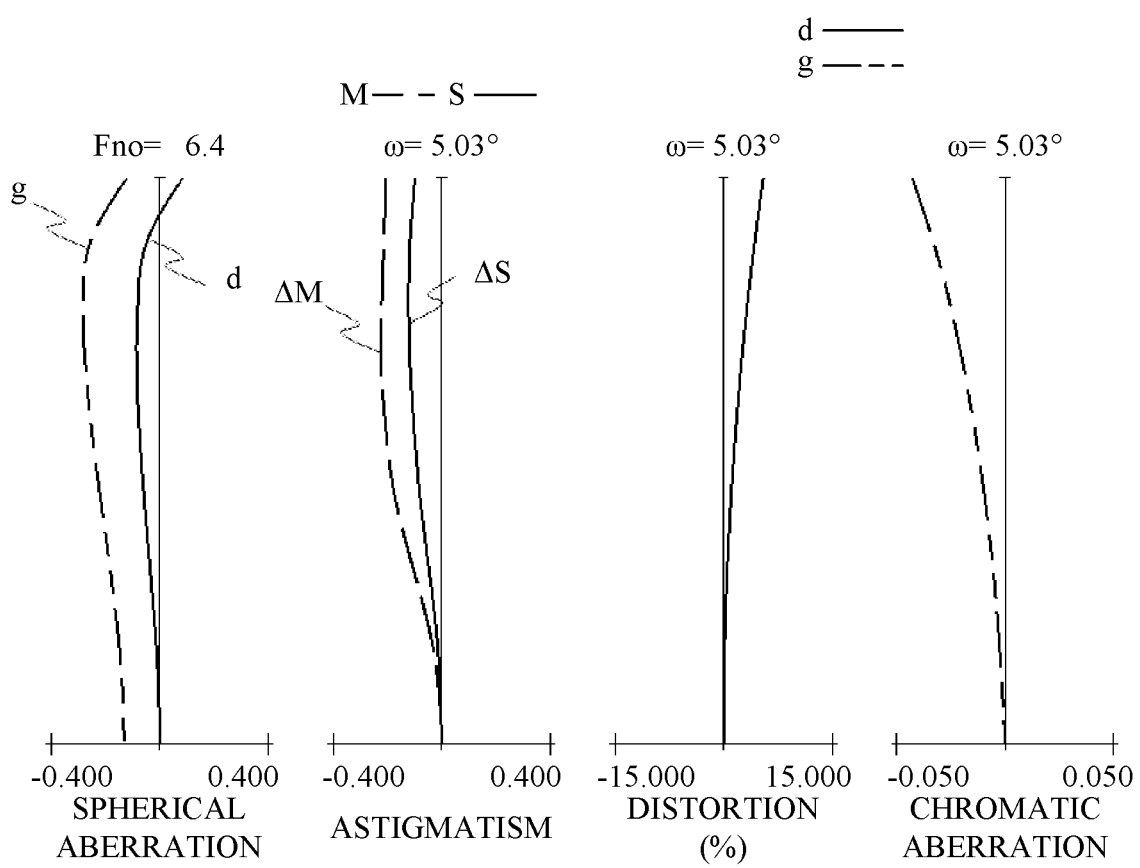

A zoom lens of the Example 3 illustrated in FIG. 5 has a zoom ratio of 9.3 and an aperture ratio of about 4.1 to 6.4. In the zoom lens of the Example 3, first, second and third lens units L1, L2 and L3 respectively have positive, negative and positive refractive powers, as described above, a fourth lens unit L4 has a positive refractive power, a fifth lens unit L5 has a negative refractive power, and a sixth lens unit L6 has a negative refractive power. In the zoom lens of the Example 3, during zooming from a wide-angle end to a telephoto end, the first lens unit L1 monotonically moves to an object side, and the second lens unit L2 to the sixth lens unit L6 move so that a distance between the first lens unit L1 and the second lens unit L2 widens, a distance between the second lens unit L2 and the third lens unit L3 narrows, a distance between the third lens unit L3 and the fourth lens unit L4 narrows, a distance between the fourth lens unit L4 and the fifth lens unit L5 narrows, and a distance between the fifth lens unit L5 and the sixth lens unit L6 widens. During focusing from an infinite distance to a short distance, the fifth lens unit L5 moves to an image side.

Figure 7:
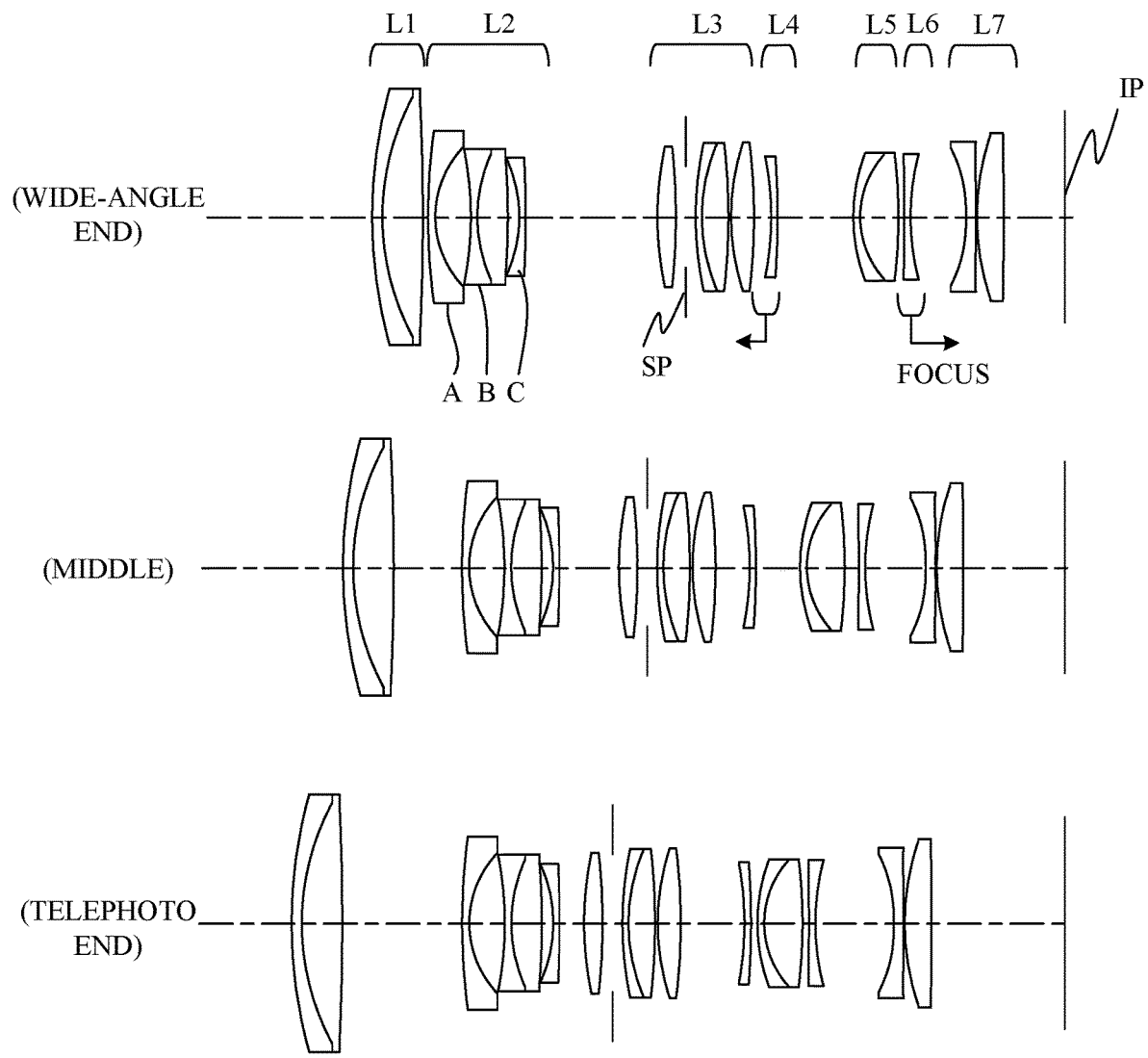
FIG. 7 is a sectional view illustrating a zoom lens at a wide-angle end, a middle zoom position, and a telephoto end, according to an Example 4.
Figure 8A:
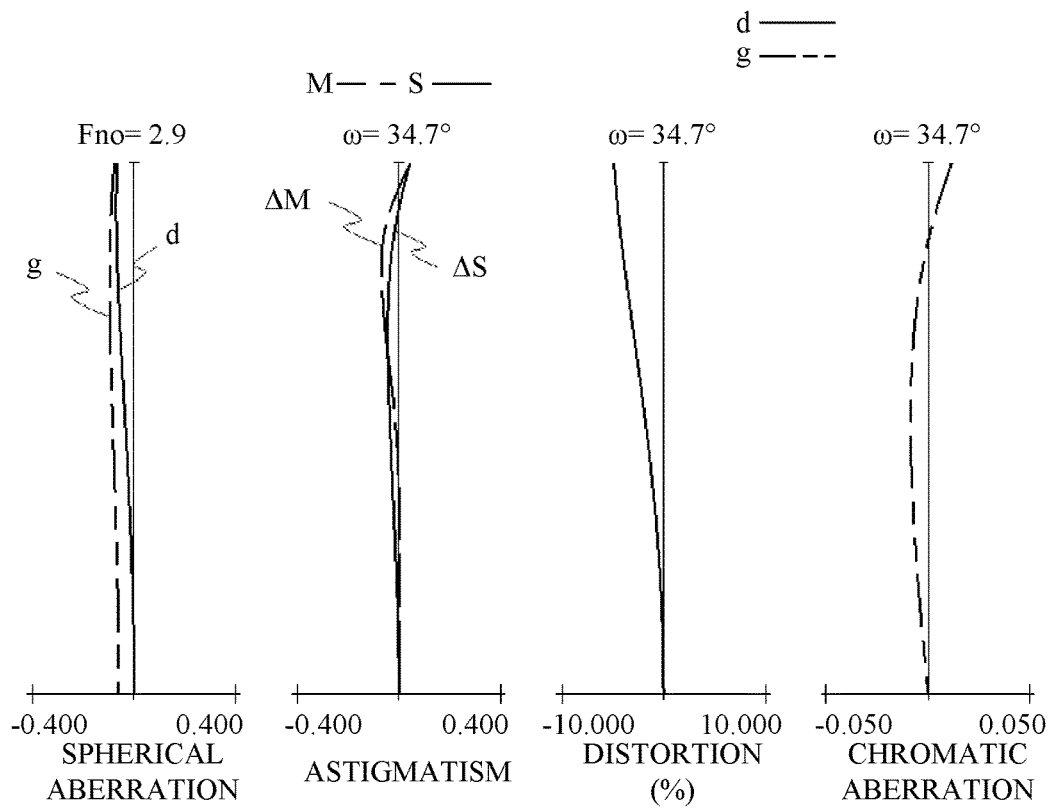
FIGS. 8A to 8C are aberration diagrams of the zoom lens at the wide-angle end, the middle zoom position, and the telephoto end, according to the Example 4.
Figure 8B:
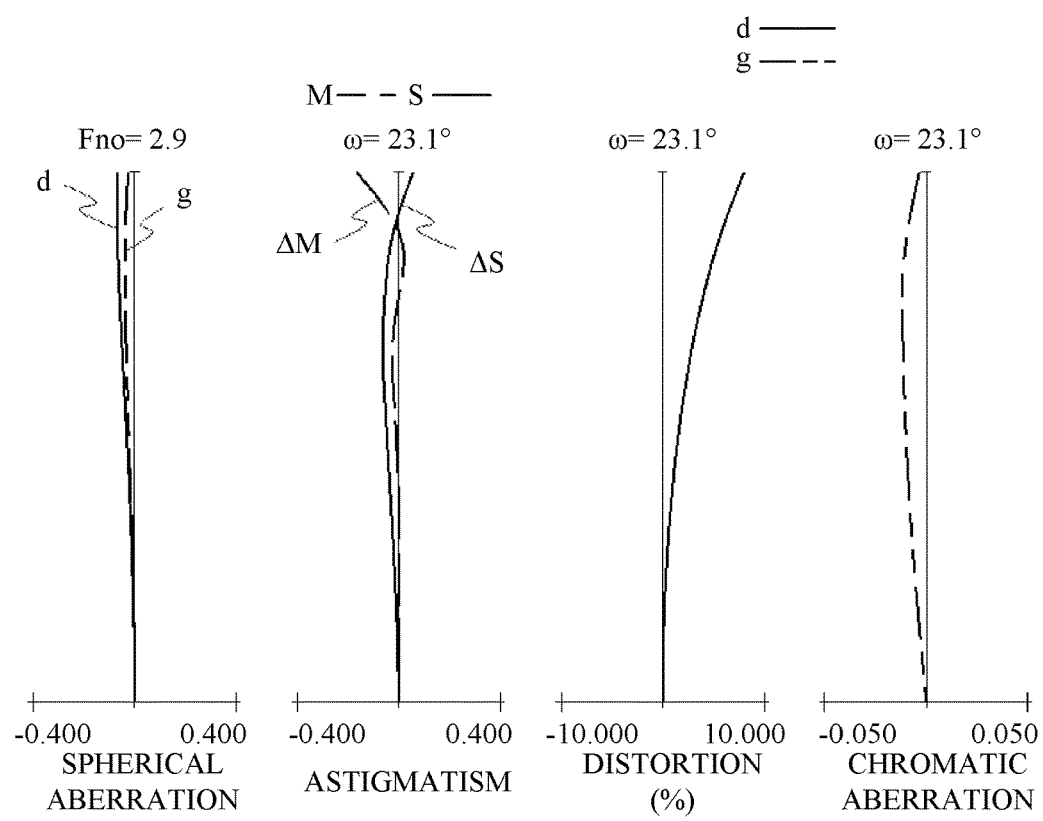
Figure 8C:
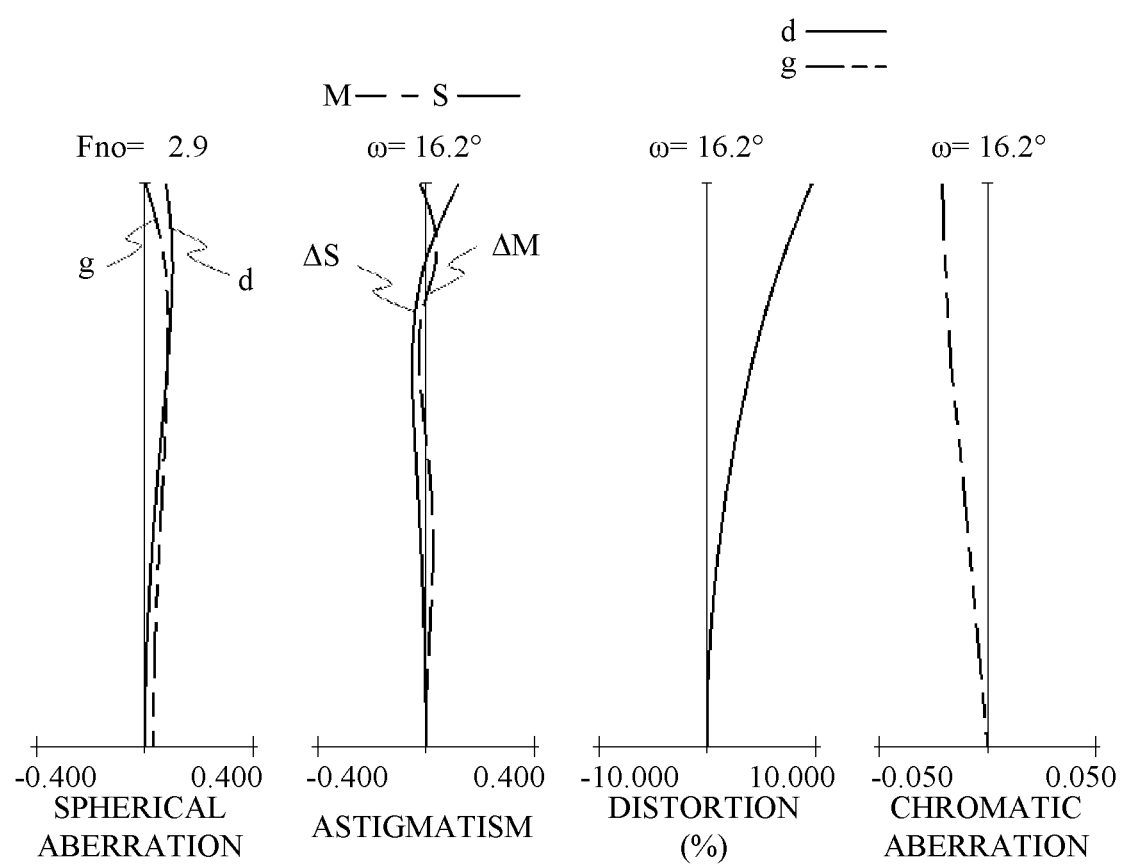

A zoom lens of Example 4 illustrated in FIG. 7 has a zoom ratio of 2.4 and an aperture ratio of about 2.9 in an entire zoom area. In the zoom lens of the Example 4, first, second and third lens units L1, L2 and L3 respectively have positive, negative and positive refractive powers, as described above, a fourth lens unit L4 has a negative refractive power, a fifth lens unit L5 has a positive refractive power, a sixth lens unit L6 has a negative refractive power, and a seventh lens unit L7 has a negative refractive power. In the zoom lens of the Example 4, during zooming from a wide-angle end to a telephoto end, the first lens unit L1 monotonically moves to an object side, and the second lens unit L2 to the seventh lens unit L7 move so that a distance between the first lens unit L1 and the second lens unit L2 widens, a distance between the second lens unit L2 and the third lens unit L3 narrows, a distance between the third lens unit L3 and the fourth lens unit L4 widens, a distance between the fourth lens unit L4 and the fifth lens unit L5 narrows, a distance between the fifth lens unit L5 and the sixth lens unit L6 varies, and a distance between the sixth lens unit L6 and the seventh lens unit L7 widens. During focusing from an infinite distance to a short distance, the fourth lens unit L4 moves to the object side and the sixth lens unit L6 moves to an image side.

In the Examples 1 to 4, the zoom lenses consisting of five to seven lens units are described, but the number of lens units is not limited to this as long as four or more lens units including the above-described first to third lens units are included.

Hereinafter, a description will be given of conditions which the zoom lens of each example satisfies.

A following inequality (1) is satisfied where skm represents a minimum value of a back focus in an entire zoom area, f2 represents a focal length of the second lens unit L2, d21 represents a distance on an optical axis between a lens surface on the image side of the single lens A and a lens surface on a most object side of the cemented lens B, and d22 represents a distance on the optical axis between a lens surface on a most image side of the cemented lens B and a lens surface on the object side of the single lens C.

$$1.35 \leq |f2|/skm \leq 5.00 \tag{1}$$

$$3.0 \leq d21/d22 \leq 10.0 \tag{2}$$

The inequality (1) expresses a condition for shortening the overall lens length at the wide-angle end and for ensuring a high optical performance, the condition relating to a relationship between the focal length f2 of the second lens unit L2 and the minimum value skm of the back focus. The overall lens length is a sum of a back focus as an air conversion value and a distance on the optical axis from the lens surface on a most object side to the lens surface on the most image side. The back focus is a distance on the optical axis from the most image side lens surface, which is a lens surface on the most image side when a parallel plate such as a filter is removed, to a paraxial image plane for an infinite object point.

In a positive lead type zoom lens, on a wide-angle end, a refractive power arrangement is generally made to a retrofocus type refractive power arrangement as a whole, and on a telephoto end, the refractive power arrangement is generally made to a telephoto type refractive power arrangement as a whole. Thereby, a high zoom ratio is realized. Thus, when the overall lens length is to be reduced at the wide-angle end, the refractive power of the second lens unit L2 is properly set. If the inequality (1) is satisfied, it is possible to acquire both the small size and the high performance.

If |f2|/skm is larger than the upper limit of the inequality (1), the refractive power of the second lens unit L2 is small, and the overall lens length increases so as to ensure an angle of view required at the wide-angle end. If |f2|/skm is smaller than the lower limit of the inequality (1), the refractive power of the second lens unit L2 is large, it is difficult to correct lateral chromatic aberration and field curvature on the telephoto side, and further insufficient correction occurs on spherical aberration and coma on the telephoto side.

The inequality (2) expresses a condition for acquiring a wider angle while reducing a fluctuation in field curvature during zooming, the condition relating to a relationship between the distances d21 and d22. If the single lens A is disposed on the object side in the second lens unit L2 so that d21/d22 is larger than the upper limit of the inequality (2), field curvature is corrected well, but a diameter of the first lens unit L1 increases, hindering the size from being small. If the single lens C is disposed on the image side in the second lens unit L2 so that d21/d22 is smaller than the lower limit of the inequality (2), it is difficult to correct well spherical aberration and coma on the telephoto side.

The numerical ranges of the inequalities (1) and (2) may be set as follows.

$$1.38 \leq |f2|/skm \leq 3.00 \tag{1a}$$

$$3.0 \leq d21/d22 \leq 6.0 \tag{2a}$$

If the inequality (1a) is satisfied, it is easy to reduce a variation in lateral chromatic aberration for each wavelength while an astigmatic difference is reduced on the wide-angle side. If the inequality (2a) is satisfied, the overall lens length can be shortened while the spherical aberration is reduced on the telephoto side.

The numerical ranges of the inequalities (1) and (2) may be set as follows.

$$1.41 \leq |f2|/skm \leq 2.00 \tag{1b}$$

$$3.1 \leq d21/d22 \leq 4.0 \tag{2b}$$

As described above, if each lens unit properly configured and the inequalities (1) and (2) are satisfied at the same time, it is possible to correct well various aberrations such as spherical aberration and coma, and to realize a zoom lens, which is robust to a manufacturing error and has a high optical performance, while the entire zoom lens system has a small size.

The zoom lens of each example may satisfy at least one of following inequalities (3) to (12).

fw and ft respectively represent focal lengths of the zoom lens at the wide-angle end and the telephoto end, and f1 and f3 respectively represent focal lengths of the first lens unit L1 and the third lens unit L3. SFA represents a shape factor of the single lens A, and SFbc represents a shape factor of an air lens formed between the cemented lens B and the single lens C. RBm represents a curvature radius of a cemented surface of the cemented lens B. For the negative lens in the cemented lens B and the single lens C, nBC represents an average value of refractive indexes for a d-line, and vBC represents an average value of Abbe numbers for the d-line. In the zoom lens, V represents a third-order aberration coefficient of distortion that occurs at the wide-angle end, and dmin represents a percentage of distortion at a maximum image height at the wide-angle end.

$$1.0 \leq SFA \leq 10.0 \tag{3}$$

$$-2.0 \leq SFbc \leq 1.0 \tag{4}$$

$$0.6 \leq |RBm/f2| \leq 3.0 \tag{5}$$

$$1.51 \leq nBC \leq 1.85 \tag{6}$$

$$40 \leq vBC \leq 80 \tag{7}$$

$$4.0 \leq |f1/f2| \leq 8.0 \tag{8}$$

$$3.5 \leq |f1/fw| \leq 10.0 \tag{9}$$

$$0.2 \leq |f3/ft| \leq 0.6 \tag{10}$$

$$0.3 \leq V \leq 1.0 \tag{11}$$

$$-15.0 \leq dmin \leq -4.4 \tag{12}$$

The Abbe number vd for the d-line is expressed by a following expression, where Nd, NF, and NC represent refractive indexes for the d-line (587.6 nm), a F-line (486.1 nm), and a C-line (656.3 nm) of Fraunhofer lines, respectively.

$$vd=(Nd-1)/(NF-NC)$$

The shape factor SFA is a shape factor of the single lens A, and is expressed by a following expression where RA1 represents a curvature radius of a lens surface on the object side of the single lens A, and RA2 represents a curvature radius of the lens surface on the image side of the single lens A. When the surface has an aspherical surface shape, the curvature radius means a radius (base R) of a quadric surface as the reference.

$$SFA=-(RA2+RA1)/(RA2-RA1)$$

The shape factor SFbc is expressed by a following expression, where RB2 represents a curvature radius of the lens surface on the most image side of the cemented lens B, and RC1 represents a curvature radius of the lens surface on the object side of the single lens C. When a surface has an aspherical surface shape, the curvature radius means its base R.

$$SFbc=(RC1+RB2)/(RC1-RB2)$$

The inequality (3) expresses a condition for correcting the field curvature well in the wide-angle area and for reducing the size while making proper a share of magnification variation of the second lens unit L2, the condition relating to the shape factor of the single lens A. If SFA is 1, which is the lower limit of the inequality (3), the single lens A is a plano-convex lens having a concave surface facing the image side. If SFA is larger than the upper limit of the inequality (3), it is difficult to correct field curvature and astigmatism well in the wide-angle area, and fluctuation in field curvature increases during zooming. If SFA is smaller than the lower limit of the inequality (3), fluctuation in the lateral chromatic aberration for on the angle of view increases in the wide-angle area.

The inequality (4) expresses a condition for reducing spherical aberration on the telephoto side while reducing an astigmatic difference in the wide-angle area, the condition relating to a shape of the air lens. The air lens has a strong convex surface on the image side, and is sandwiched between media with refractive indexes of 1 or more on both sides, and thus a difference in refractive indexes occurs. Therefore, the air lens can be regarded as a lens having a refractive index which is similar to that of a negative lens. By the air lens having such a shape, it is possible to reduce the number of lenses constituting the second lens unit L2. If SFbc is larger than the upper limit of the inequality (4), a curvature of a surface on the image side of the air lens becomes stronger, which leads to insufficient correction of spherical aberration on the telephoto side. If SFbc is smaller than the lower limit of the inequality (4), a curvature of the surface on the object side of the air lens becomes stronger, which causes an increase in astigmatic difference in the wide-angle area.

The inequality (5) expresses a condition for making proper a share of aberration correction of the cemented lens B in the second lens unit L2, the condition relating to a relationship between the curvature radius RBm of the cemented surface of the cemented lens B and the focal length of the second lens unit L2. If |RBm/f2| is larger than the upper limit of the inequality (5), a curvature radius of the cemented surface is too large, and field curvature is insufficiently corrected in the wide-angle area. If |RBm/f2| is smaller than the lower limit of the inequality (5), the curvature radius of the cemented surface is too small, which causes high-order aberration and variations in spherical aberration and field curvature for each wavelength.

The inequalities (6) and (7) express conditions for reducing field curvature on the wide-angle side while reducing an occurrence of lateral chromatic aberration at the wide-angle end, the condition relating to material of the negative lens of the cemented lens B and single lens C which is a negative lens. If the refractive index nBC and the Abbe number νBC are within the numerical ranges of inequalities (6) and (7), respectively, it is easy to make a primary achromatic effect proper.

The inequality (8) expresses a condition for reducing the size of the entire system while ensuring a proper magnification variation ratio, the condition relating to a relationship between the focal length f1 of the first lens unit L1 and the focal length f2 of the second lens unit L2. In a zoom lens which is bright in the telephoto area, if the refractive power of the first lens unit L1 is not properly set within a range where aberration can be corrected, the overall lens length increases in the telephoto area, and the diameter of the first lens unit L1 increases for ensuring a peripheral light amount. If |f1/f2| is larger than the upper limit of the inequality (8), the refractive power of the first lens unit L1 decreases, the overall lens length increases, and it is difficult to ensure the peripheral light amount. If |f1/f2| is smaller than the lower limit of the inequality (8), fluctuation in aberration increases, where the aberration is caused by moving the first lens unit L1 and the second lens unit L2 during zooming, and therefore it is particularly difficult to correct spherical aberration.

The inequality (9) expresses a condition for making proper a share of magnification variation of the first lens unit L1 while reducing the size of the zoom lens, the condition relating to a relationship between the focal length f1 of the first lens unit L1 and the focal length fw of the zoom lens at the wide-angle end. When the first lens unit L1 has a proper refractive power, it is possible to reduce a moving amount of the first lens unit L1 during zooming. If |f1/fw| is larger than the upper limit of the inequality (9), the refractive power of the first lens unit L1 is weak, the magnification variation effect is weakened, and thus the moving amount of the first lens unit L1 is increased during zooming for covering a magnification variation effect. As a result, the overall lens length increases at the telephoto end. Moreover, it is necessary to ensure the share of magnification variation in the third lens unit L3 or a lens unit on the image side of the third lens unit L3, various aberrations such as spherical aberration and coma greatly occur in the telephoto area, a lens or an aspherical lens is to be added for correcting the aberration, and therefore robustness to a manufacturing error lowers. If |f1/fw| is smaller than the lower limit of the inequality (9), the refractive power of the first lens unit L1 is too strong, and spherical aberration greatly occurs in the first lens unit L1, in the telephoto area.

The inequality (10) expresses a condition for ensuring a share of magnification variation of the third lens unit L3 while properly correcting spherical aberration and coma, the conditions relating to a relationship between the focal length f3 of the third lens unit L3 and the focal length ft of the zoom lens at the telephoto end. If |f3/ft| is larger than the upper limit of the inequality (10), the refractive power of the third lens unit L3 is weak, the magnification variation effect is weakened, and the moving amount of the third lens unit L3 during zooming is increased. If |f3/ft| is smaller than the lower limit of the inequality (10), the refractive power of the third lens unit L3 is too strong, spherical aberration and coma occur in the telephoto area, and an astigmatic difference occurs in a central area of the image plane.

The inequality (11) expresses a condition for properly correcting field curvature and astigmatism, and for reducing deterioration in resolution caused by stretching at a time when distortion is electronically corrected for captured image data in an image pickup apparatus, the condition relating to the third-order aberration coefficient V of distortion If V is larger than the upper limit of the inequality (11), distortion is large and deterioration in resolution caused by stretching increases. If V is smaller than the lower limit of the inequality (11), it is difficult to correct well field curvature and lateral chromatic aberration.

The inequality (12) expresses a condition for properly correcting field curvature and lateral chromatic aberration, the condition relating to the percentage dmin of distortion at the maximum image height at the wide-angle end. If dmin is larger than the upper limit of the inequality (12), it is advantageous for reducing the size, but the distortion increases and the resolution greatly deteriorates due to stretching. If dmin is smaller than the lower limit of the inequality (12), it is difficult to reduce a variation in lateral chromatic aberration (especially, lateral chromatic aberration for a short wavelength component) for the image height.

The first lens unit L1 may consist of a cemented lens of a negative lens and a positive lens, and a meniscus-shaped single lens having a positive refractive power. With this configuration, it is possible to correct lateral chromatic aberration well in the entire zoom area, and to easily correct well spherical aberration and on-axis chromatic aberration in the telephoto area.

The third lens unit L3 may include, on the most object side, a single lens which has a positive refractive power and is convex to the object side. A light beam entering the third lens unit L3 from the second lens unit L2 has a high ray height, the second lens unit L2 being a main unit for performing the magnification variation, and this light beam may cause higher-order spherical aberration and coma. Therefore, if the third lens unit L3 includes, on the most object side, the single lens which has the positive refractive power and is convex to the object side, it is easy to ensure a positive refractive power required to converge the light beam emitted from the second lens unit L2, and to effectively reduce occurrences of spherical aberration and coma.

In the lens unit on the most image side, the lens on the most image side may be a positive lens which is convex to the image side. This makes it easy to ensure the back focus, and makes it possible to reduce an accumulation of unnecessary light (ghost) caused by the image sensor in the image pickup apparatus.

The lens unit on the image side of the third lens unit L3 may have an aspherical surface. This makes it possible to make the zoom lens small while the field curvature is effectively corrected at the wide-angle end.

The numerical ranges of the inequalities (3) to (12) may be set as follows.

$$1.1 \leq SFA \leq 9.0 \tag{3a}$$

$$-1.7 \leq SFbc \leq 0.3 \tag{4a}$$

$$0.8 \leq |RBm/f2| \leq 1.8 \tag{5a}$$

$$1.52 \leq nBC \leq 1.82 \tag{6a}$$

$$44 \leq vBC \leq 78 \tag{7a}$$

$$5.0 \leq |f1/f2| \leq 7.2 \tag{8a}$$

$$4.0 \leq |f1/fw| \leq 9.0 \tag{9a}$$

$$0.22 \leq |f3/ft| \leq 0.55 \tag{10a}$$

$$0.31 \leq V \leq 0.60 \tag{11a}$$

$$-14.0 \leq d\mathrm{min} \leq -4.6 \tag{12a}$$

When the inequality (3a) is satisfied, field curvature is more properly corrected in the wide-angle area, and it becomes easier to correct the field curvature even if the zoom lens has a wider angle of view. When the inequality (4a) satisfied, it is easier to correct spherical aberration and coma in the telephoto area. When the inequality (5a) is satisfied, it is easy to reduce a variation in field curvature in the wide-angle area for each wavelength. When the inequalities (6a) and (7a) are satisfied, it is easy to reduce fluctuation in the lateral chromatic aberration during zooming. When the inequality (8a) is satisfied, shares of magnification variation of the first lens unit L1 and the second lens unit L2 becomes more proper, and it becomes easier to reduce the size even if the magnification is increased. When the inequality (9a) is satisfied, it is easy to correct lateral chromatic aberration in the wide-angle area and spherical aberration in the telephoto side. When the inequality (10a) is satisfied, a share of magnification variation of the third lens unit L3 is more proper, and it is easier to reduce fluctuation in coma caused by zooming. When the inequalities (10a) and (11a) are satisfied, it is easy to correct well field curvature, astigmatism and lateral chromatic aberration.

The numerical ranges of the inequalities (3) to (12) may be set as follows.

$$1.1 \leq SFA \leq 8.4 \tag{3b}$$

$$-1.5 \leq SFbc \leq 0.1 \tag{4b}$$

$$1.0 \leq |RBm/f2| \leq 1.5 \tag{5b}$$

$$1.53 \leq nBC \leq 1.79 \tag{6b}$$

$$48 \leq vBC \leq 76 \tag{7b}$$

$$5.1 \leq |f1/f2| \leq 6.8 \tag{8b}$$

$$4.3 \leq |f1/fw| \leq 8.6 \tag{9b}$$

$$0.24 \leq |f3/ft| \leq 0.50 \tag{10b}$$

$$0.32 \leq V \leq 0.50 \tag{11b}$$

$$-13.0 \leq d\mathrm{min} \leq -4.9 \tag{12b}$$

Numerical Examples 1 to 4 corresponding to the Examples 1 to 4 are given below. In each numerical example, r represents a curvature radius (mm) of an i-th surface from the object side, d represents a lens thickness or an air distance (mm) between the i-th surface and an (i+1)-th surfaces, and nd represents a refractive index for the d-line of material of an i-th optical element. vd represents an Abbe number for the d-line of the material of the i-th optical element, and is expressed as described above. BF represents a back focus (mm) described above, and an overall lens length is as described above.

"*" attached to a surface number represents that the surface is an aspherical surface. The aspherical surface shape is expressed by a following expression, where X represents a position in the optical axis direction, H represents a height in a direction orthogonal to an optical axis, a traveling direction of light is assumed to be positive, R represents a paraxial curvature radius, K represents a conic constant, A4, A6, A8, A10, A12, and A14 represent aspherical surface coefficients. "e-x" of the conic constant and the aspherical surface coefficient means "×10⁻ˣ".

$$X = \frac{\frac{H^2}{R}}{1+\sqrt{1-(1+K)\left(\frac{H}{R}\right)^2}} + A4H^4 +$$

$$A6H^6 + A8H^8 + A10H^{10} + A12H^{12} + A14H^{14}$$

FIGS. 2A to 2C, 4A to 4C, 6A to 6C and 8A to 8C are aberration diagrams at the wide-angle end, the middle zoom position, and the telephoto end of the zoom lenses of the Examples 1, 2, 3 and 4 (Numerical Examples 1, 2, 3 and 4), respectively. In each aberration diagram, Fno represents an F-number. ω represents a half angle of view (°), which is a half angle of view based on a ray-tracking value. In each spherical aberration diagram, a solid line indicates spherical aberration for the d-line (wavelength 587.6 nm), and a two-dot chain line indicates spherical aberration for the g-line (wavelength 435.8 nm). In each astigmatism diagram, a solid line S indicates a sagittal image plane and a broken line M indicates a meridional image plane. Distortion is distortion for the d-line. Each chromatic aberration diagram indicates lateral chromatic aberration for the g-line.

Table 1 summarizes the values of the above-mentioned inequalities (1) to (12) in the Numerical Examples 1 to 4.

Numerical Example 1

UNIT: mm

SURFACE DATA

| Surface number | r | d | nd | νd |
|---|---|---|---|---|
| 1 | 141.907 | 1.80 | 1.84666 | 23.8 |
| 2 | 65.733 | 6.40 | 1.61997 | 63.9 |
| 3 | 375.431 | 0.15 | | |
| 4 | 49.725 | 6.89 | 1.75500 | 52.3 |
| 5 | 195.174 | (variable) | | |
| 6 | 59.541 | 1.50 | 1.91082 | 35.3 |
| 7 | 13.279 | 7.12 | | |
| 8 | −34.401 | 1.00 | 1.61997 | 63.9 |
| 9 | 16.635 | 4.95 | 2.00069 | 25.5 |
| 10 | 3167.419 | 2.05 | | |
| 11 | −18.970 | 1.00 | 1.81600 | 46.6 |
| 12 | −27.118 | (variable) | | |
| 13* | 63.703 | 2.89 | 1.68948 | 31.0 |
| 14* | −99.524 | 1.99 | | |
| 15 (diaphragm) | ∞ | 1.60 | | |
| 16 | 34.995 | 1.00 | 1.92286 | 18.9 |
| 17 | 22.173 | 5.92 | 1.49700 | 81.5 |
| 18 | −27.379 | 0.50 | | |
| 19 | 29.006 | 3.98 | 1.49700 | 81.5 |
| 20 | −51.300 | 0.80 | 1.79952 | 42.2 |
| 21 | 17.375 | 1.25 | | |
| 22* | 15.325 | 6.22 | 1.61881 | 63.9 |
| 23* | −19.673 | (variable) | | |
| 24 | −2180.198 | 0.80 | 1.61800 | 63.4 |
| 25 | 13.874 | 1.79 | | |
| 26 | 110.502 | 0.81 | 1.53172 | 48.8 |
| 27 | 12.881 | 3.31 | 1.69680 | 55.5 |
| 28 | 35.478 | (variable) | | |
| 29 | −63.517 | 3.37 | 1.91082 | 35.3 |
| 30 | −29.610 | (variable) | | |
| Image plane | ∞ | | | |

ASPHERICAL SURFACE DATA

13th surface

K = 0.00000e+000 A4 = −5.42417e−005 A6 = −3.16930e−007
A8 = 6.13967e−009 A10 = −6.00779e−011 A12 = 2.86581e−013

14th surface

K = 0.00000e+000 A4 = −3.80560e−005 A6 = −4.63751e−008
A8 = 1.22944e−009

22nd surface

K = 0.00000e+000 A4 = −5.29719e−005 A6 = −2.59814e−007
A8 = 1.05461e−008 A10 = −2.66191e−010 A12 = 3.17312e−012
A14 = −1.46144e−014

23rd surface

K = 0.00000e+000 A4 = 3.28246e−005 A6 = −3.67629e−007
A8 = 1.07289e−008 A10 = −2.30132e−010 A12 = 2.56287e−012
A14 = −1.12454e−014

VARIOUS DATA
Zoom ratio 3.26

| | Wide-angle | Middle | Telephoto |
|---|---|---|---|
| Focal length | 16.50 | 27.55 | 53.81 |
| Fno | 2.90 | 2.90 | 2.90 |
| Half angle of view (°) | 42.26 | 25.94 | 13.98 |
| Image height | 14.00 | 14.00 | 14.00 |
| Overall lens length | 103.55 | 109.78 | 129.89 |
| BF | 14.18 | 12.29 | 10.01 |
| d 5 | 1.00 | 10.82 | 26.55 |
| d12 | 14.42 | 5.47 | 1.17 |
| d23 | 1.73 | 2.88 | 2.06 |
| d28 | 3.14 | 9.24 | 21.03 |
| d30 | 14.18 | 12.29 | 10.01 |

LENS UNIT DATA

| Unit | Starting surface | Focal length |
|---|---|---|
| 1 | 1 | 81.38 |
| 2 | 6 | −15.58 |
| 3 | 13 | 17.39 |
| 4 | 24 | −20.78 |
| 5 | 29 | 58.15 |

Numerical Example 2

UNIT: mm

SURFACE DATA

| Surface number | r | d | nd | νd |
|---|---|---|---|---|
| 1 | 83.118 | 1.40 | 1.84666 | 23.8 |
| 2 | 56.427 | 6.85 | 1.49700 | 81.5 |
| 3 | −1326.263 | 0.20 | | |
| 4 | 48.649 | 5.26 | 1.59349 | 67.0 |
| 5 | 148.191 | (variable) | | |
| 6 | 183.953 | 0.80 | 1.75500 | 52.3 |
| 7 | 11.681 | 5.86 | | |
| 8 | −51.451 | 0.80 | 1.43700 | 95.1 |
| 9 | 13.472 | 3.67 | 2.00069 | 25.5 |
| 10 | 34.940 | 1.76 | | |
| 11 | −35.851 | 0.90 | 1.69350 | 53.2 |
| 12 | 892.261 | (variable) | | |

-continued

UNIT: mm

| | | | | |
|---|---|---|---|---|
| 13 (diaphragm) | ∞ | 1.00 | | |
| 14* | 18.698 | 3.68 | 1.59201 | 67.0 |
| 15* | −155.400 | 2.76 | | |
| 16 | 26.703 | 5.55 | 1.59349 | 67.0 |
| 17 | −12.422 | 1.00 | 1.74951 | 35.3 |
| 18 | 18.379 | 1.68 | | |
| 19* | 14.044 | 5.71 | 1.61997 | 63.9 |
| 20* | −17.299 | (variable) | | |
| 21* | −87.154 | 0.95 | 1.69680 | 55.5 |
| 22* | 13.514 | (variable) | | |
| 23* | 66.645 | 3.62 | 1.85150 | 40.8 |
| 24* | −24.723 | (variable) | | |
| Image plane | ∞ | | | |

ASPHERICAL SURFACE DATA

14th surface

K = 0.00000e+000 A4 = −3.19336e−005 A6 = 2.75554e−008
A8 = 8.65981e−010 A10 = −4.45959e−011

15th surface

K = 0.00000e+000 A4 = −3.32402e−005 A6 = 2.70013e−007
A8 = −9.74804e−010 A10 = −4.38601e−011

19th surface

K = 0.00000e+000 A4 = −1.24687e−004 A6 = −1.46779e−008
A8 = −2.71966e−009 A10 = 7.08977e−011 A12 = −2.21430e−012

20th surface

K = 0.00000e+000 A4 = 3.46001e−005 A6 = −4.17983e−007
A8 = 6.61896e−009 A10 = −8.28361e−011 A12 = −9.12824e−013

21st surface

K = 0.00000e+000 A4 = −1.41421e−005 A6 = 1.31038e−007
A8 = 3.35676e−008 A10 = −5.80528e−010 A12 = −4.18368e−012

22nd surface

K = 0.00000e+000 A4 = −4.16982e−005 A6 = 9.65766e−007
A8 = 1.61197e−009 A10 = −2.42704e−010

23rd surface

K = 0.00000e+000 A4 = −5.15783e−005 A6 = −8.15623e−008
A8 = 3.11409e−009 A10 = −2.21549e−011

24th surface

K = 0.00000e+000 A4 = −2.28395e−005 A6 = −8.86433e−008
A8 = 3.44750e−009 A10 = −2.40365e−011

VARIOUS DATA
Zoom ratio 7.12

| | Wide-angle | Middle | Telephoto |
|---|---|---|---|
| Focal length | 9.27 | 25.02 | 66.00 |
| Fno | 2.92 | 2.92 | 2.92 |
| Half angle of view (°) | 41.18 | 15.73 | 6.13 |
| Image height | 7.50 | 7.50 | 7.50 |
| Overall lens length | 93.25 | 104.11 | 132.73 |
| BF | 11.10 | 9.23 | 8.22 |
| d 5 | 1.00 | 15.88 | 40.84 |
| d12 | 21.37 | 6.03 | 3.87 |
| d20 | 2.74 | 7.09 | 5.35 |
| d22 | 3.59 | 12.45 | 21.01 |
| d24 | 11.10 | 9.23 | 8.22 |

LENS UNIT DATA

| Unit | Starting surface | Focal length |
|---|---|---|
| 1 | 1 | 79.43 |
| 2 | 6 | −11.81 |
| 3 | 13 | 16.35 |
| 4 | 21 | −16.73 |
| 5 | 23 | 21.57 |

Numerical Example 3

UNIT: mm

SURFACE DATA

| Surface number | r | d | nd | vd |
|---|---|---|---|---|
| 1 | 137.130 | 1.85 | 2.00100 | 29.1 |
| 2 | 77.212 | 8.00 | 1.49700 | 81.5 |
| 3 | −576.767 | 0.15 | | |
| 4 | 73.139 | 6.00 | 1.61800 | 63.4 |
| 5 | 640.146 | (variable) | | |
| 6 | 234.390 | 1.46 | 1.85150 | 40.8 |
| 7 | 24.687 | 4.95 | | |
| 8 | −64.697 | 1.22 | 1.78800 | 47.4 |
| 9 | 26.551 | 4.64 | 1.89286 | 20.4 |
| 10 | −188.141 | 1.53 | | |
| 11 | −35.617 | 1.13 | 1.77250 | 49.6 |
| 12 | −122.937 | (variable) | | |
| 13 (diaphragm) | ∞ | 0.40 | | |
| 14 | 26.891 | 4.07 | 1.76200 | 40.1 |
| 15 | −1337.440 | 0.15 | | |
| 16 | 37.497 | 4.63 | 1.56732 | 42.8 |
| 17 | −38.643 | 0.82 | 1.83400 | 37.2 |
| 18 | 29.821 | 2.75 | | |
| 19 | 33.110 | 0.80 | 2.00069 | 25.5 |
| 20 | 17.901 | 4.35 | 1.72000 | 43.7 |
| 21 | −296.974 | 2.63 | | |
| 22 | −27.276 | 0.80 | 1.90366 | 31.3 |
| 23 | −70.600 | (variable) | | |
| 24* | 32.376 | 5.72 | 1.49700 | 81.5 |
| 25* | −39.478 | 0.15 | | |
| 26 | 826.864 | 1.40 | 1.85478 | 24.8 |
| 27 | 141.190 | 5.28 | 1.59282 | 68.6 |
| 28 | −31.712 | (variable) | | |
| 29 | 83.236 | 2.37 | 1.63980 | 34.5 |
| 30 | −217.841 | 1.00 | 1.63854 | 55.4 |
| 31 | 23.212 | (variable) | | |
| 32 | −46.541 | 1.32 | 1.77250 | 49.6 |
| 33 | 79.652 | 4.36 | 1.84666 | 23.8 |
| 34 | −121.577 | (variable) | | |
| Image plane | ∞ | | | |

ASPHERICAL SURFACE DATA

24th surface

K = 0.00000e+000 A4 = −1.47986e−005 A6 = 4.76484e−008

25th surface

K = 0.00000e+000 A4 = 2.38781e−005 A6 = 3.36467e−008
A8 = −1.25459e−010 A10 = 1.78308e−012 A12 = −5.29676e−015

VARIOUS DATA
Zoom ratio 9.32

| | Wide-angle | Middle | Telephoto |
|---|---|---|---|
| Focal length | 24.97 | 85.37 | 232.79 |
| Fno | 4.12 | 5.66 | 6.40 |
| Half angle of view (°) | 41.55 | 13.50 | 5.03 |
| Image height | 19.45 | 21.64 | 21.64 |
| Overall lens length | 140.70 | 180.88 | 210.70 |
| BF | 12.99 | 41.24 | 52.16 |
| d 5 | 1.35 | 33.29 | 61.98 |
| d12 | 24.60 | 10.03 | 2.26 |
| d23 | 8.41 | 2.97 | 0.95 |
| d28 | 4.31 | 4.10 | 1.33 |
| d31 | 15.11 | 15.31 | 18.09 |
| d34 | 12.99 | 41.24 | 52.16 |

LENS UNIT DATA

| Unit | Starting surface | Focal length |
|---|---|---|
| 1 | 1 | 109.85 |
| 2 | 6 | −18.42 |
| 3 | 13 | 62.29 |

-continued

UNIT: mm

| 4 | 24 | 23.83 |
| 5 | 29 | -51.59 |
| 6 | 32 | -119.78 |

Numerical Example 4

UNIT: mm

SURFACE DATA

| Surface number | r | d | nd | vd |
|---|---|---|---|---|
| 1 | 97.752 | 2.10 | 1.84666 | 23.8 |
| 2 | 51.859 | 8.31 | 1.69680 | 55.5 |
| 3 | -479.946 | (variable) | | |
| 4 | 126.411 | 1.50 | 1.65160 | 58.5 |
| 5 | 20.764 | 7.30 | | |
| 6 | -69.567 | 1.30 | 1.59282 | 68.6 |
| 7 | 31.197 | 6.27 | 1.83400 | 37.2 |
| 8 | -149.658 | 2.35 | | |
| 9 | -28.416 | 1.30 | 1.49700 | 81.5 |
| 10 | -218.301 | (variable) | | |
| 11 | 68.216 | 3.82 | 1.49700 | 81.5 |
| 12 | -122.027 | 2.00 | | |
| 13 (diaphragm) | ∞ | 2.00 | | |
| 14 | 71.871 | 1.25 | 1.80610 | 40.9 |
| 15 | 38.009 | 5.48 | 1.49700 | 81.5 |
| 16 | -126.656 | 0.50 | | |
| 17 | 48.382 | 4.76 | 1.59282 | 68.6 |
| 18 | -116.174 | (variable) | | |
| 19 | -62.029 | 1.30 | 1.85025 | 30.1 |
| 20 | -158.006 | (variable) | | |
| 21 | 36.456 | 1.40 | 1.83481 | 42.7 |
| 22 | 19.142 | 7.88 | 1.59282 | 68.6 |
| 23 | -103.001 | (variable) | | |
| 24 | -839.204 | 1.30 | 1.61800 | 63.4 |
| 25 | 50.474 | (variable) | | |
| 26* | -55.814 | 2.00 | 1.53110 | 55.9 |
| 27* | 297.774 | 0.20 | | |
| 28 | 52.015 | 5.49 | 1.49700 | 81.5 |
| 29 | -870.096 | (variable) | | |
| Image plane | ∞ | | | |

ASPHERICAL SURFACE DATA

26th surface

K = 0.00000e+000 A4 = -6.72296e-005 A6 = 1.99840e-007
A8 = -2.01249e-011 A10 = -5.49137e-013
27th surface K = 0.00000e+000 A4 = -4.73615e-005 A6 = 2.37281e-007
A8 = -2.89941e-010

VARIOUS DATA
Zoom ratio 2.35

| | Wide-angle | Middle | Telephoto |
|---|---|---|---|
| Focal length | 28.84 | 46.89 | 67.79 |
| Fno | 2.90 | 2.90 | 2.90 |
| Half angle of view (°) | 34.71 | 23.13 | 16.22 |
| Image height | 19.00 | 21.64 | 21.64 |
| Overall lens length | 141.90 | 147.87 | 158.37 |
| BF | 12.51 | 20.74 | 27.26 |
| d 3 | 1.00 | 13.89 | 24.42 |
| d10 | 27.04 | 12.25 | 5.09 |
| d18 | 3.47 | 6.93 | 13.04 |
| d20 | 15.58 | 9.00 | 1.27 |
| d23 | 1.13 | 2.86 | 1.28 |
| d25 | 11.36 | 12.40 | 16.19 |
| d29 | 12.51 | 20.74 | 27.26 |

-continued

UNIT: mm

LENS UNIT DATA

| Unit | Starting surface | Focal length |
|---|---|---|
| 1 | 1 | 138.96 |
| 2 | 4 | -25.00 |
| 3 | 11 | 31.06 |
| 4 | 19 | -120.85 |
| 5 | 21 | 63.15 |
| 6 | 24 | -77.00 |
| 7 | 26 | -958.71 |

TABLE 1

| | Example 1 | Example 2 | Example 3 | Example 4 |
|---|---|---|---|---|
| fw | 16.500 | 9.270 | 24.971 | 28.840 |
| ft | 53.813 | 65.999 | 232.793 | 67.793 |
| f1 | 81.382 | 79.427 | 109.848 | 138.961 |
| f2 | -15.580 | -11.806 | -18.423 | -25.000 |
| f3 | 17.39 | 16.35 | 64.95 | 31.06 |
| d21 | 7.12 | 5.86 | 4.95 | 7.30 |
| d22 | 2.05 | 1.76 | 1.53 | 2.35 |
| skm | 10.009 | 8.222 | 12.987 | 12.507 |
| RBm | 16.635 | 13.472 | 26.551 | 31.197 |
| (1)|f2|/skm | 1.557 | 1.436 | 1.419 | 1.999 |
| (2)d21/d22 | 3.473 | 3.330 | 3.235 | 3.106 |
| (3)SFA | 1.574 | 1.136 | 1.235 | 8.354 |
| (4)SFbc | -0.988 | 0.013 | -1.467 | -0.681 |
| (5)|RBm/f2| | 1.068 | 1.141 | 1.441 | 1.248 |
| (6)nBC | 1.7180 | 1.5653 | 1.7803 | 1.5449 |
| (7)vBC | 55.25 | 74.15 | 48.50 | 75.05 |
| (8)|f1/f2| | 5.223 | 6.728 | 5.962 | 5.558 |
| (9)|f1/fw| | 4.932 | 8.568 | 4.399 | 4.818 |
| (10)f3/ft | 0.323 | 0.248 | 0.279 | 0.458 |
| (11)V | 0.363 | 0.452 | 0.484 | 0.328 |
| (12)dmin (%) | -6.62 | -7.54 | -12.11 | -4.89 |

Figure 9:
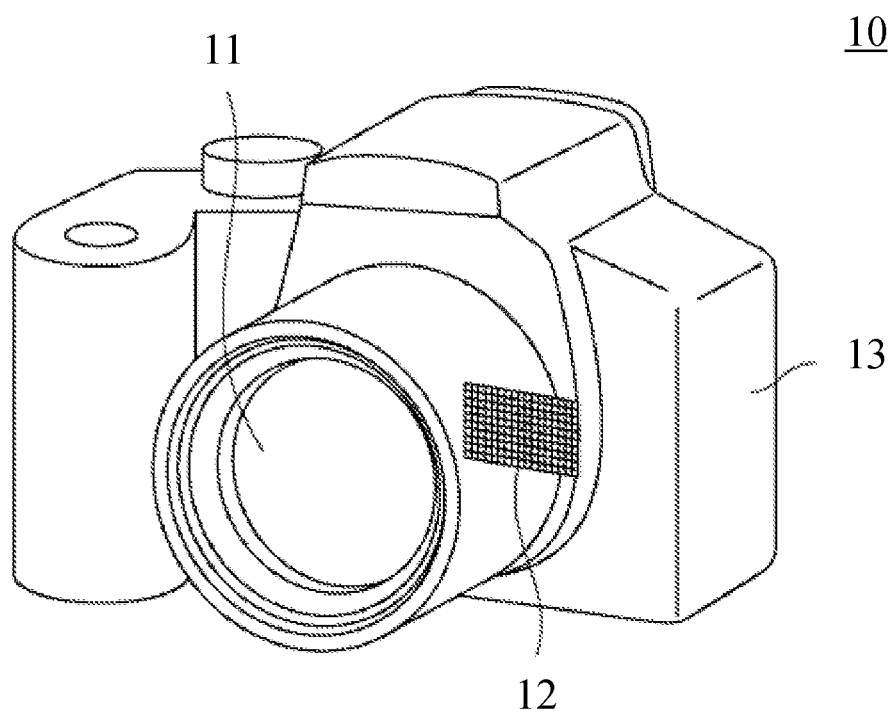
FIG. 9 is a diagram illustrating an image pickup apparatus including a zoom lens according to any one of Examples 1 to 4.

FIG. 9 illustrates a digital still camera as an image pickup apparatus using the zoom lens of any of the Examples 1 to 4 as an image pickup optical system. A reference numeral 10 denotes a camera body, and a reference numeral 11 denotes an image pickup optical system. A reference numeral 12 denotes a solid-state image sensor, which is a photoelectric conversion element, such as a CCD sensor or a CMOS sensor, which is built in the camera body 10 and is configured to receive an optical image formed by the image pickup optical system 11 and to perform photoelectric conversion. The camera body 10 may be a single-lens reflex camera having a quick turn mirror, or may be a mirrorless camera not having a quick turn mirror.

When any of the zoom lenses in the Examples 1 to 4 is used as the image pickup optical system of the image pickup apparatus as described above, it is possible to realize an image pickup apparatus which has a small size as a whole and can capture a high-quality image.

According to the above examples, it is possible to provide a small-sized zoom lens which is robust to a manufacturing error and has a high optical performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No 2020-120924, filed on Jul. 14, 2020 which is hereby incorporated by reference herein in its entirety.

What is claimed is:

1. A zoom lens comprising four or more lens units including, in order from an object side to an image side, a first lens unit having a positive refractive power, a second lens unit having a negative refractive power, and a third lens unit having a positive refractive power,
wherein a distance between adjacent lens units varies during zooming from a wide-angle end to a telephoto end,
wherein the first lens unit moves during zooming,
wherein a distance between the first lens unit and the second lens unit widens during zooming from the wide-angle end to the telephoto end,
wherein a distance between the second lens unit and the third lens unit narrows during zooming from the wide-angle end to the telephoto end,
wherein the first lens unit consists of three or less lenses,
wherein the second lens unit consists of, in order from the object side to the image side, a first single lens as a spherical lens having a negative refractive power, a cemented lens in which a lens having a negative refractive power and a lens having a positive refractive power are cemented, and a second single lens as a spherical lens having a negative refractive power, and
wherein following inequalities are satisfied:

$1.35 \leq |f2|/skm \leq 5.00$ $3.1 \leq d21/d22 \leq 6.0$ $48 \leq vBC \leq 80$ $3.5 \leq |f1/fw| \leq 10.0$ where skm represents a minimum value of a back focus in an entire zoom area of the zoom lens, f2 represents a focal length of the second lens unit, d21 represents a distance on an optical axis between a lens surface on the image side of the first single lens and a lens surface on a most object side of the cemented lens, and d22 represents a distance on the optical axis between a lens surface on a most image side of the cemented lens and a lens surface on the object side of the second single lens, vBC represents an average value of an Abbe numbers for a d-line, f1 represents a focal length of the first lens unit, and fw represents a focal length of the zoom lens at the wide-angle end.

2. The zoom lens according to claim 1,
wherein a following inequality is satisfied:

$1.0 - (RA2+RA1)/(RA2-RA1) \leq 10.0$ where RA1 represents a curvature radius of a lens surface on the object side of the first single lens A, and RA2 represents a curvature radius of the lens surface on the image side of the first single lens.

3. The zoom lens according to claim 1,
wherein a following inequality is satisfied:

$-2.0 \leq (RC1+RB2)/(RC1-RB2) \leq 1.0$ where RB2 represents a curvature radius of the lens surface on the most image side of the cemented lens, and RC1 represents a curvature radius of the lens surface on the object side of the second single lens.

4. The zoom lens according to claim 1,
wherein a following inequality is satisfied:

$0.6 \leq |RBm/f2| \leq 3.0$ where RBm represents a curvature radius of a cemented surface of the cemented lens.

5. The zoom lens according to claim 1,
wherein following inequalities are satisfied:

$1.51 \leq nBC \leq 1.85$ where, for materials of the lens having the negative refractive power in the cemented lens and the second single lens, nBC represents an average value of refractive indexes for the d-line.

6. The zoom lens according to claim 1,
wherein a following inequality is satisfied:

$4.0 \leq |f1/f2| \leq 8.0$ where f1 represents a focal length of the first lens unit.

7. The zoom lens according to claim 1,
wherein a following inequality is satisfied:

$0.2 \leq |f3/ft| \leq 0.6$ where f3 represents a focal length of the third lens unit, and ft represents a focal length of the zoom lens at the telephoto end.

8. The zoom lens according to claim 1,
wherein a following inequality is satisfied:

$0.3 \leq V \leq 1.0$ where V represents a third-order aberration coefficient of a distortion that occurs in the zoom lens at the wide-angle end.

9. The zoom lens according to claim 1,
wherein a following inequality is satisfied:

$-15.0 \leq dmin \leq -4.4$ where dmin represents a percentage of distortion at a maximum image height, the distortion occurring in the zoom lens at the wide-angle end.

10. The zoom lens according to claim 1,
wherein the zoom lens consists of, in order from the object side to the image side, the first, second and third lens units, a fourth lens unit having a negative refractive power, and a fifth lens unit having a positive refractive power.

11. The zoom lens according to claim 1,
wherein the zoom lens consists of, in order from the object side to the image side, the first, second and third lens units, a fourth lens unit having a negative refractive power, a fifth lens unit having a positive refractive power, and a sixth lens unit having a negative refractive power.

12. The zoom lens according to claim 1,
wherein the zoom lens consists of, in order from the object side to the image side, the first, second and third lens units, a fourth lens unit having a negative refractive power, a fifth lens unit having a positive refractive power, a sixth lens unit having a negative refractive power, and a seventh lens unit having a negative refractive power.

13. An apparatus comprising:
a zoom lens; and
a sensor configured to receive an optical image formed by the zoom lens,
wherein the zoom lens includes four or more lens units including, in order from an object side to an image side, a first lens unit having a positive refractive power, a second lens unit having a negative refractive power, and a third lens unit having a positive refractive power,
wherein a distance between adjacent lens units varies during zooming from a wide-angle end to a telephoto end, wherein the first lens unit moves during zooming,
wherein a distance between the first lens unit and the second lens unit widens during zooming from the wide-angle end to the telephoto end,
wherein a distance between the second lens unit and the third lens unit narrows during zooming from the wide-angle end to the telephoto end,
wherein the first lens unit consists of three or less lenses,
wherein the second lens unit consists of, in order from the object side to the image side, a first single lens as a spherical lens having a negative refractive power, a cemented lens in which a lens having a negative refractive power and a lens having a positive refractive power are cemented, and a second single lens as a spherical lens having a negative refractive power, and
wherein following inequalities are satisfied:

$$1.35 \leq |f2|/skm \leq 5.00$$

$$3.1 \leq d21/d22 \leq 6.0$$

$$48 \leq vBC \leq 80$$

$$3.5 \leq |f1/fw| \leq 10.0$$

where skm represents a minimum value of a back focus in an entire zoom area of the zoom lens, f2 represents a focal length of the second lens unit, d21 represents a distance on an optical axis between a lens surface on the image side of the first single lens and a lens surface on a most object side of the cemented lens, and d22 represents a distance on the optical axis between a lens surface on a most image side of the cemented lens and a lens surface on the object side of the second single lens, and vBC represents an average value of an Abbe numbers for a d-line, f1 represents a focal length of the first lens unit, and fw represents a focal length of the zoom lens at the wide-angle end.

14. The apparatus according to claim 13,
wherein a following inequality is satisfied:

$$1.0 - (RA2 + RA1)/(RA2 - RA1) \leq 10.0$$

where RA1 represents a curvature radius of a lens surface on the object side of the first single lens A, and RA2 represents a curvature radius of the lens surface on the image side of the first single lens.

15. The apparatus lens according to claim 13,
wherein a following inequality is satisfied:

$$-2.0(RC1 - RB2)/(RC1 - RB2) \leq 1.0$$

where RB2 represents a curvature radius of the lens surface on the most image side of the cemented lens, and RC1 represents a curvature radius of the lens surface on the object side of the second single lens.

16. The apparatus lens according to claim 13,
wherein a following inequality is satisfied:

$$0.6 \leq |RBm/f2| \leq 3.0$$

where RBm represents a curvature radius of a cemented surface of the cemented lens.

17. The apparatus lens according to claim 13,
wherein following inequalities are satisfied:

$$1.51 \leq nBC \leq 1.85$$

where, for materials of the lens having the negative refractive power in the cemented lens and the second single lens nBC represents an average value of refractive indexes for a d-line.

18. The apparatus lens according to claim 13,
wherein a following inequality is satisfied:

$$4.0 \leq |f1/f2| \leq 8.0$$

where f1 represents a focal length of the first lens unit.

* * * * *